(12) United States Patent
Nagata

(10) Patent No.: US 9,811,199 B2
(45) Date of Patent: Nov. 7, 2017

(54) ELECTRONIC APPARATUS AND STORAGE MEDIUM, AND OPERATING METHOD OF ELECTRONIC APPARATUS

(71) Applicant: KYOCERA Corporation, Kyoto (JP)

(72) Inventor: Keisuke Nagata, Kobe (JP)

(73) Assignee: KYOCERA Corporation, Kyoto (JP)

( * ) Notice: Subject to any disclaimer, the term of this patent is extended or adjusted under 35 U.S.C. 154(b) by 132 days.

(21) Appl. No.: 14/832,326

(22) Filed: Aug. 21, 2015

(65) Prior Publication Data

US 2015/0363040 A1 Dec. 17, 2015

Related U.S. Application Data

(63) Continuation of application No. PCT/JP2014/054165, filed on Feb. 21, 2014.

(30) Foreign Application Priority Data

Feb. 22, 2013 (JP) ................. 2013-032857

(51) Int. Cl.
*G06F 3/041* (2006.01)
*G06F 3/0482* (2013.01)
(Continued)

(52) U.S. Cl.
CPC .......... *G06F 3/0416* (2013.01); *G06F 3/0482* (2013.01); *G06F 3/0485* (2013.01);
(Continued)

(58) Field of Classification Search
None
See application file for complete search history.

(56) References Cited

U.S. PATENT DOCUMENTS

| 7,479,948 B2 | 1/2009 | Kim et al. |
| 8,941,611 B2 | 1/2015 | Koda |

(Continued)

FOREIGN PATENT DOCUMENTS

| JP | 11-039134 A | 2/1999 |
| JP | 11-327736 A | 11/1999 |

(Continued)

OTHER PUBLICATIONS

International Search Report dated Apr. 28, 2014, issued for International Application No. PCT/JP2014/054165.
(Continued)

*Primary Examiner* — Kenneth B Lee, Jr.
(74) *Attorney, Agent, or Firm* — Procopio Cory Hargreaves and Savitch LLP

(57) ABSTRACT

An electronic apparatus comprises a display module configured to perform display in a display area, a detection module configured to detect a manipulation of a manipulator to move for a predetermined distance or more within a predetermined period of time while being in contact with or in proximity to the display area and then depart from the display area, a moving speed acquiring module configured to obtain a moving speed of the manipulator in the manipulation, and a processing executing module configured to execute a first processing when the moving speed of the manipulator in the manipulation is smaller than a threshold and execute a second processing different from the first processing when the moving speed of the manipulator in the manipulation is greater than the threshold.

15 Claims, 22 Drawing Sheets

(51) Int. Cl.
*G06F 3/0485* (2013.01)
*G06F 3/0488* (2013.01)
*H04M 1/2745* (2006.01)

(52) U.S. Cl.
CPC ... *G06F 3/04883* (2013.01); *H04M 1/274525* (2013.01); *H04M 2250/22* (2013.01)

(56) References Cited

U.S. PATENT DOCUMENTS

| | | |
|---|---|---|
| 2009/0066668 A1 | 3/2009 | Kim et al. |
| 2011/0161888 A1 | 6/2011 | Ito et al. |
| 2012/0182325 A1 | 7/2012 | Hayashi |
| 2012/0206481 A1* | 8/2012 | Endo .................... G06F 3/0481 345/619 |

FOREIGN PATENT DOCUMENTS

| | | |
|---|---|---|
| JP | 2007-293820 A | 11/2007 |
| JP | 2011-138410 A | 7/2011 |
| JP | 2011-204127 A | 10/2011 |
| JP | 2012-146160 A | 8/2012 |
| JP | 2012-168943 A | 9/2012 |

OTHER PUBLICATIONS

Written Opinion of the International Searching Authority issued by Japan Patent Office for International Application No. PCT/JP2014/054165.

\* cited by examiner

F I G. 3
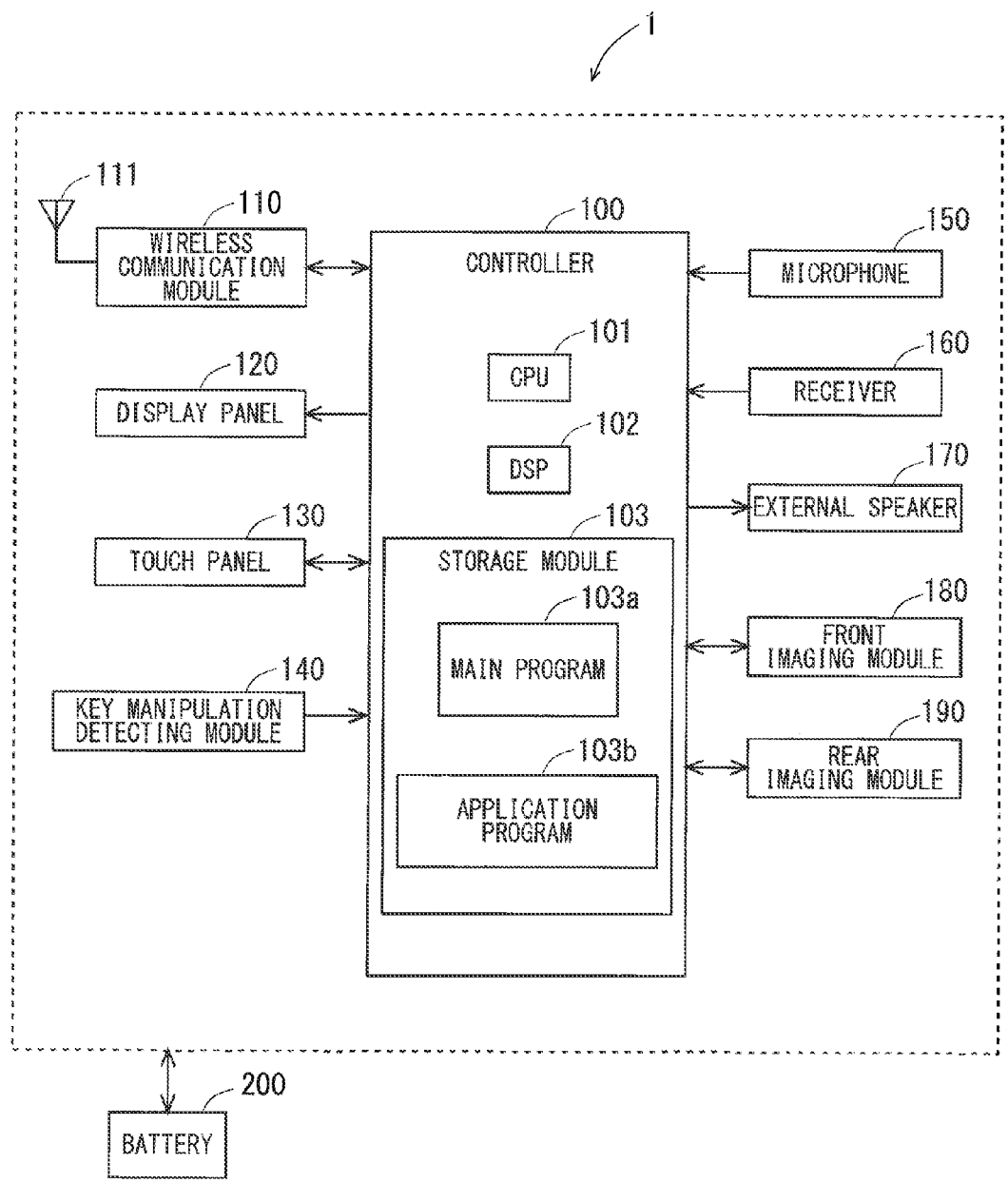

F I G . 4
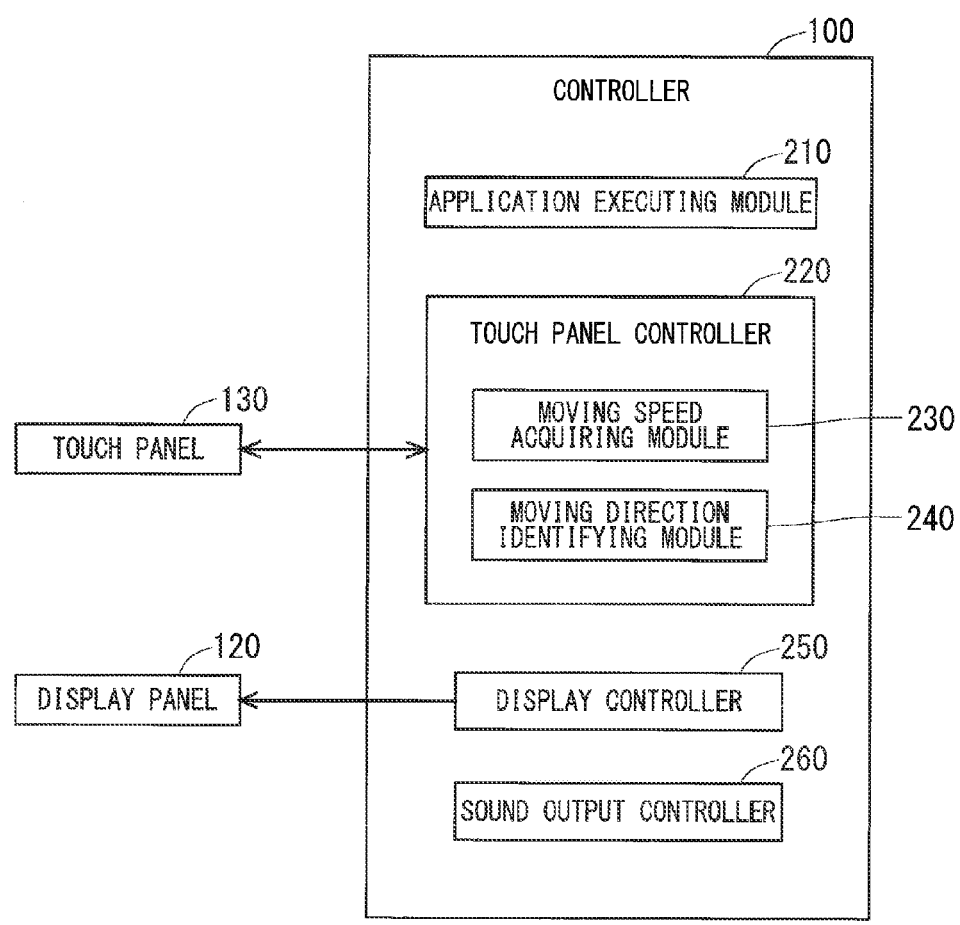

F I G . 1 7
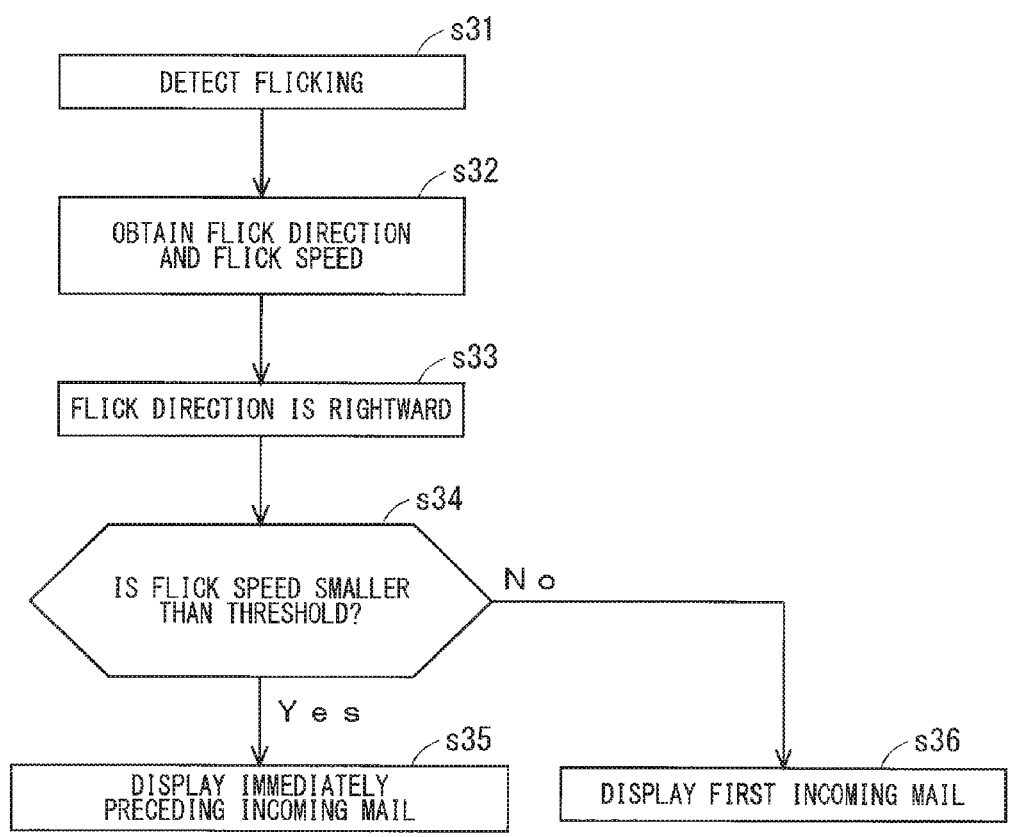

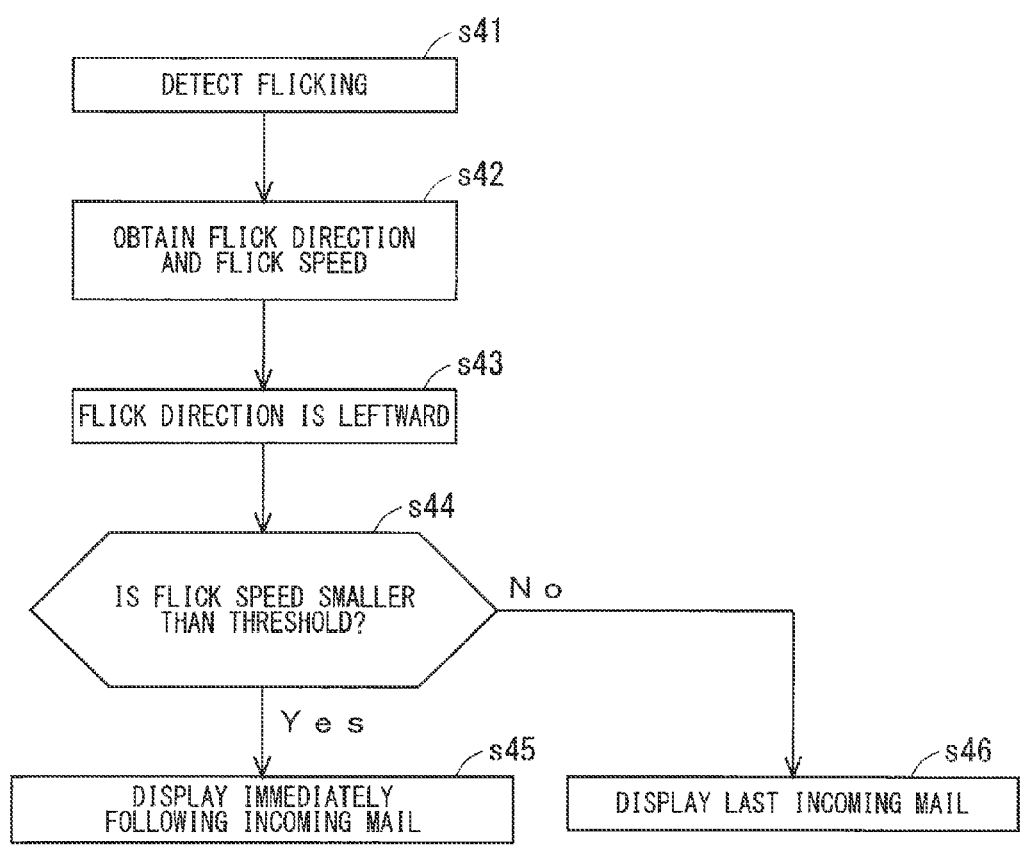
F I G . 1 8

F I G. 2 5
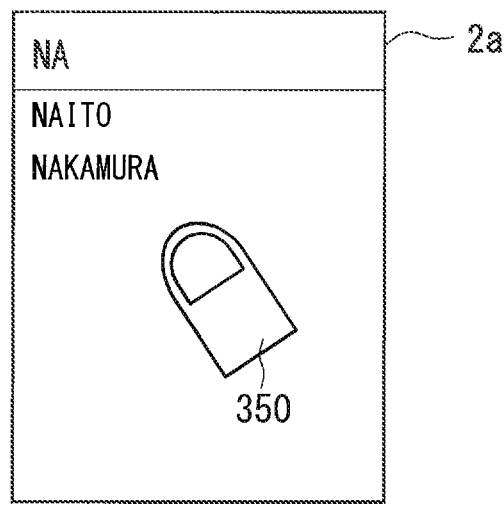
F I G. 2 6
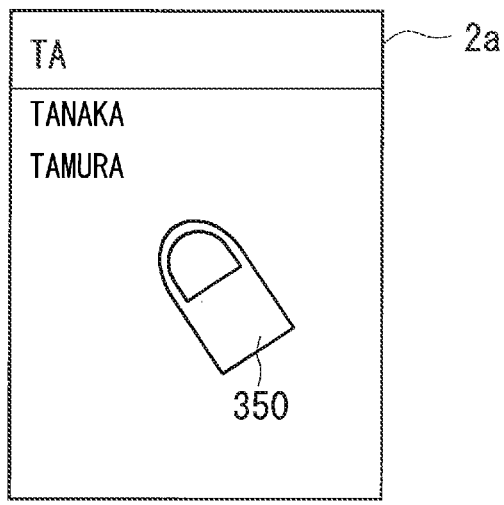

F I G . 2 9
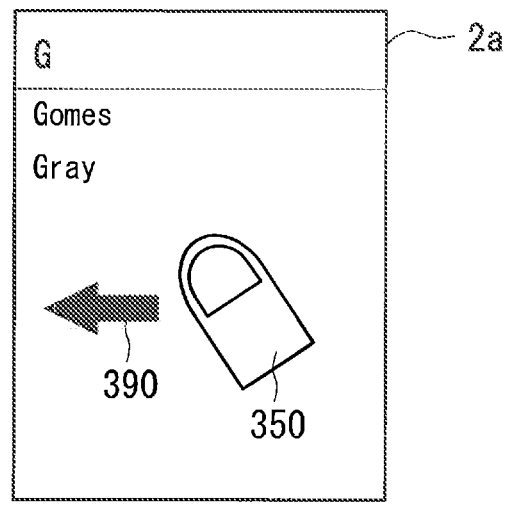
F I G . 3 0
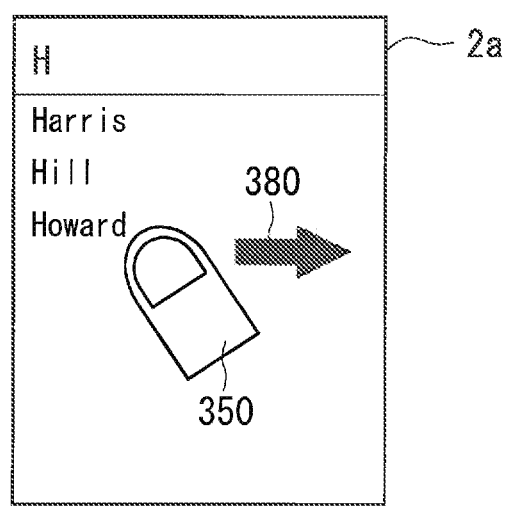

F I G. 3 3
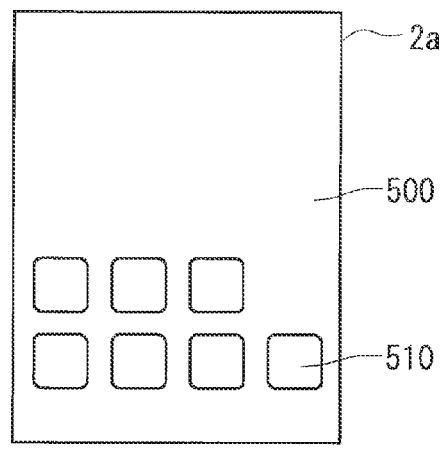
F I G. 3 4
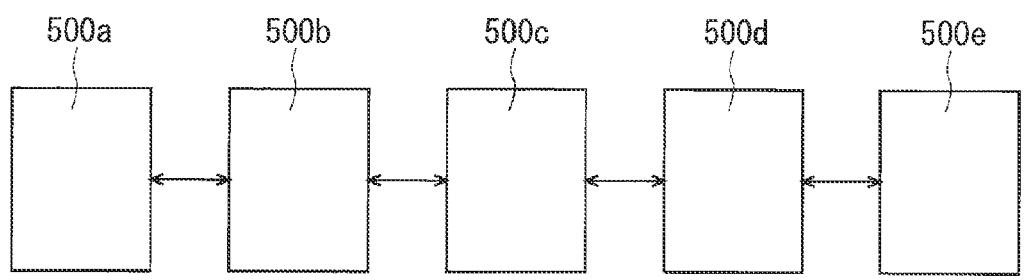

F I G . 3 5
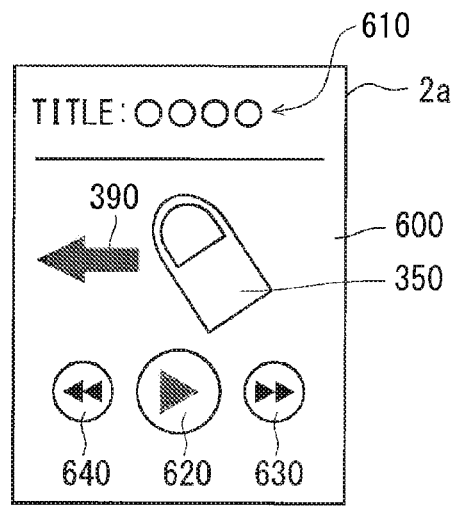
F I G . 3 6
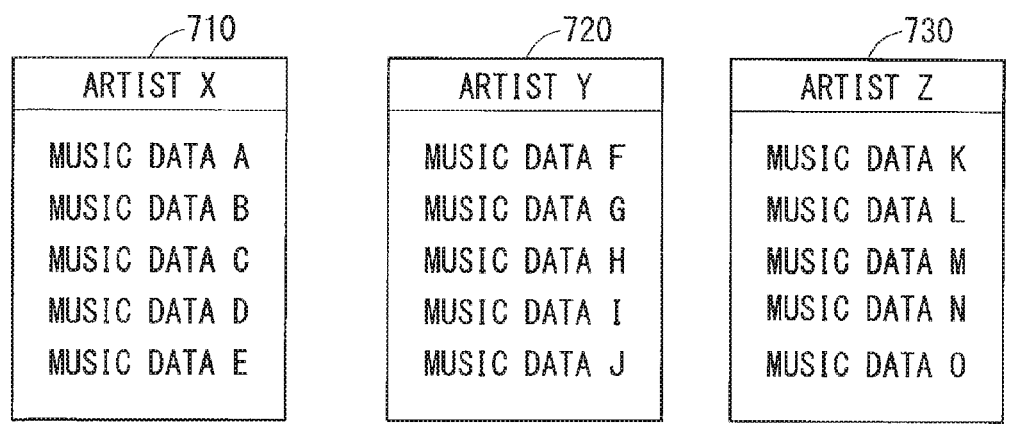

ELECTRONIC APPARATUS AND STORAGE MEDIUM, AND OPERATING METHOD OF ELECTRONIC APPARATUS

CROSS-REFERENCE TO RELATED APPLICATION

The present application is a continuation based on PCT Application No. PCT/JP2014/054165 filed on Feb. 21, 2014, which claims the benefit of Japanese Application No. 2013-032857 filed on Feb. 22, 2013. Both PCT Application No. PCT/JP2014/054165 and Japanese Application No. 2013-032857 are entitled "ELECTRONIC DEVICE, CONTROL PROGRAM, AND METHOD FOR OPERATING ELECTRONIC DEVICE". The contents of which are incorporated by reference herein in their entirety.

FIELD

Embodiments of the present disclosure relate to an electronic apparatus.

BACKGROUND

Various techniques have traditionally been proposed in relation to electronic apparatuses.

SUMMARY

An electronic apparatus, storage medium, and method are disclosed. In one embodiment, an electronic apparatus comprises a display module configured to perform display in a display area, a detection module configured to detect a manipulation of a manipulator to move for a predetermined distance or more within a predetermined period of time while being in contact with or in proximity to the display area and then depart from the display area, a moving speed acquiring module configured to obtain a moving speed of the manipulator in the manipulation, and a processing executing module configured to execute a first processing when the moving speed of the manipulator in the manipulation is smaller than a threshold and execute a second processing different from the first processing when the moving speed of the manipulator in the manipulation is greater than the threshold.

In one embodiment, a non-transitory storage medium readable by a computer stores a control program that controls an electronic apparatus comprising a display area. The storage medium storing the control program is configured to cause the electronic apparatus to execute the steps of (a) detecting a manipulation of a manipulator to move for a predetermined distance or more within a predetermined period of time while being in contact with or in proximity to the display area and then depart from the display area, (b) obtaining a moving speed of the manipulator in the manipulation, and (c) upon detection of the manipulation in the step (b), executing a first processing when the moving speed of the manipulator in the manipulation is smaller than a threshold and executing a second processing different from the first processing when the moving speed of the manipulator in the manipulation is greater than the threshold.

In one embodiment, an operating method of an electronic apparatus comprising a display area comprises the steps of (a) detecting a manipulation of a manipulator to move for a predetermined distance or more within a predetermined period of time while being in contact with or in proximity to the display area and then depart from the display area, (b) obtaining a moving speed of the manipulator in the manipulation, and (c) upon detection of the manipulation in the step (b), executing a first processing when the moving speed of the manipulator in the manipulation is smaller than a threshold and executing a second processing different from the first processing when the moving speed of the manipulator in the manipulation is greater than the threshold.

BRIEF DESCRIPTION OF THE DRAWINGS

FIG. 3 illustrates a block diagram of an electrical configuration of the electronic apparatus.

FIG. 4 illustrates a functional block to be formed in a controller.

FIG. 17 illustrates a flowchart showing an operation of the electronic apparatus.

FIG. 18 illustrates a flowchart showing an operation of the electronic apparatus.

FIG. 25 illustrates a display example of the electronic apparatus.

FIG. 26 illustrates a display example of the electronic apparatus.

FIG. 29 illustrates a display example of the electronic apparatus.

FIG. 30 illustrates a display example of the electronic apparatus.

FIG. 33 illustrates a display example of the electronic apparatus.

FIG. 34 illustrates a plurality of home screens.

FIG. 35 illustrates a display example of the electronic apparatus.

FIG. 36 illustrates an example of a plurality of folders storing music data.

DETAILED DESCRIPTION

<External Appearance of Electronic Apparatus>

Figure 1:
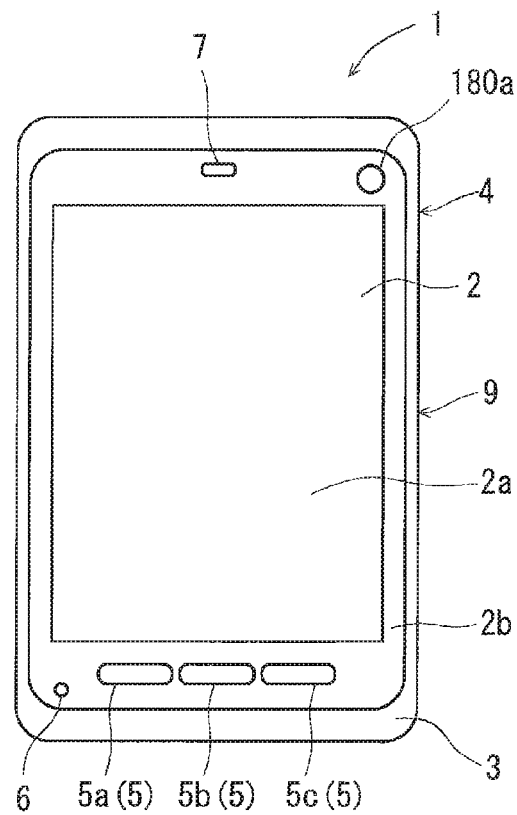
FIG. 1 illustrates a front view of an external appearance of an electronic apparatus.
Figure 2:
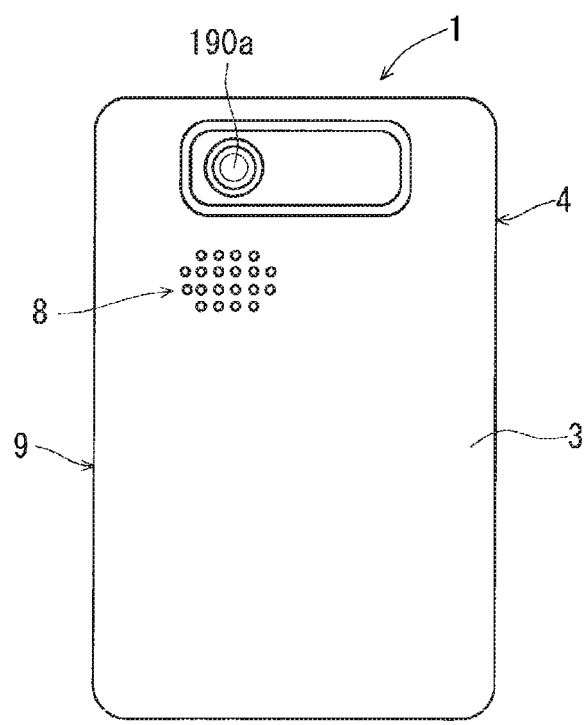
FIG. 2 illustrates a rear view of the external appearance of the electronic apparatus.

FIGS. 1 and 2 illustrate a front view and a rear view, respectively, of an external appearance of an electronic apparatus 1 according to one embodiment. The electronic apparatus 1 according to one embodiment, which is, for example, a mobile phone, can communicate with other communication apparatuses via a base station, server, and the like. As illustrated in FIGS. 1 and 2, the electronic apparatus 1 includes a cover panel 2 and a case portion 3. The combined cover panel 2 and case portion 3 form an apparatus case 4 shaped into a plate substantially rectangular in plan view.

The cover panel 2 has a substantially rectangular shape in plan view. The cover panel 2 forms a portion other than a peripheral edge portion in a front portion of the electronic apparatus 1. The cover panel 2 is made of a transparent glass or a transparent acrylic resin. The case portion 3 forms the peripheral edge portion of the front portion, a side portion, and a rear portion of the electronic apparatus 1. The case portion 3 is made of, for example, a polycarbonate resin.

A front surface of the cover panel 2 is provided with a display area 2a in which various information such as characters, symbols, and diagrams appear. The display area 2a has, for example, a rectangular shape in plan view. A peripheral edge portion 2b of the cover panel 2, which surrounds the display area 2a, is opaque and/or not transparent because of, for example, a film or the like that is attached thereto. The peripheral edge portion 2b is accordingly a non-display portion in which no information appears. A touch panel 130 described below is attached to the rear surface of the cover panel 2. A user can provide various instructions to the electronic apparatus 1 by manipulating the display area 2a of the front surface of the electronic apparatus 1 with a finger or the like. Also, the user can provide various instructions to the electronic apparatus 1 by manipulating the display area 2a with a manipulator other than a finger, for example, a pen for an electrostatic touch panel such as a stylus pen.

Inside the apparatus case 4 are provided a home key 5a, a menu key 5b, and a back key 5c. Each of the home key 5a, the menu key 5b, and the back key 5c is a hardware key. Each surface of the home key 5a, the menu key 5b, and the back key 5c is exposed from the lower end of the front surface of the cover panel 2. The home key 5a is a manipulation key for displaying a home screen (initial screen) in the display area 2a. The menu key 5b is a manipulation key for displaying an option menu screen. The back key 5c is a manipulation key for returning a display of the display area 2a to the immediately preceding display. Throughout the specification, if the home key 5a, the menu key 5b, and the back key 5c need not to be particularly distinguished from each other, each of which is referred to as a "manipulation key 5." The home key 5a, the menu key 5b, and the back key 5c need not to be hardware keys but may be software keys which are displayed in the display area 2a and for which manipulations are detected by the touch panel 130.

The cover panel 2 has a microphone hole 6 provided at its lower end portion and a receiver hole 7 provided at its upper end portion. At the upper end portion of the front surface of the cover panel 2, an imaging lens 180a of a front imaging module 180 described below is visually recognizable. On the lateral surface of the apparatus case 4 (case portion 3), an earphone terminal 9 is provided. As illustrated in FIG. 2, speaker holes 8 are provided in the rear surface of the electronic apparatus 1, namely, the rear surface of the apparatus case 4. Through the rear surface of the electronic apparatus 1, an imaging lens 190a of a rear imaging module 190 described below is visually recognizable.

<Electrical Configuration of Electronic Apparatus>

FIG. 3 illustrates a block diagram of the electrical configuration of the electronic apparatus 1. As illustrated in FIG. 3, the electronic apparatus 1 includes a controller 100, a wireless communication module 110, a display panel 120, the touch panel 130, and a key manipulation detecting module 140. Additionally, the electronic apparatus 1 includes a microphone 150, a receiver 160, an external speaker 170, the front imaging module 180, the rear imaging module 190, and a battery 200. The apparatus case 4 houses these components of the electronic apparatus 1.

The controller 100 includes a CPU (Central Processing Unit) 101, a DSP (Digital Signal Processor) 102, and a storage module 103. The controller 100 can control other components of the electronic apparatus 1 to manage the operation of the electronic apparatus 1 in a supervising manner. The storage module 103 is formed of a non-transitory recording medium that can be read by the controller 100 (the CPU 101 and the DSP 102), such as a ROM (Read Only Memory) or a RAM (Random Access Memory). The storage module 103 stores a main program 103a that is a control program for controlling the operation of the electronic apparatus 1, specifically, the components such as the wireless communication module 110 and the display panel 120 of the electronic apparatus 1, a plurality of application programs 103b, and the like. The CPU 101 and the DSP 102 execute the various programs in the storage module 103, so that the functions of the controller 100 are executed. For brevity, FIG. 3 shows only one application program 103b.

The storage module 103 may include a non-transitory, computer-readable recording medium other than the ROM and the RAM. The storage module 103 may include, for example, a small hard disk drive and an SSD (Solid State Drive).

The wireless communication module 110 has an antenna 111. The wireless communication module 110 can receive, by the antenna 111, a signal from another mobile phone different from the electronic apparatus 1 or a communication apparatus such as a web server connected to the Internet via, for example, a base station. The wireless communication module 110 can amplify and down-convert a received signal and then output a resultant signal to the controller 100. The controller 100, for example, demodulates a received signal to be input thereto, thereby acquiring a sound signal indicative of voice, music, or the like included in the received signal. The wireless communication module 110 up-converts and amplifies a transmission signal including a sound signal, thereby wirelessly transmitting a resultant transmission signal from the antenna 111. The transmission signal from the antenna 111 is received by the mobile phone different from the electronic apparatus 1 or the communication apparatus connected to the Internet via, for example, the base station.

The display panel 120 is, for example, a liquid crystal display panel or an organic electroluminescent (EL) panel. The display panel 120 is controlled by the controller 100 and can accordingly display various information such as characters, symbols, and diagrams. The information displayed on the display panel 120 appears in the display area 2a on the front surface of the cover panel 2. It is therefore apparent that the display panel 120 can perform display in the display area 2a.

The touch panel 130 is controlled by the controller 100 and can accordingly detect a manipulation on the display area 2a of the cover panel 2 with a manipulator such as a finger. The touch panel 130 is, for example, a projected capacitive touch panel and is attached to the rear surface of the cover panel 2. When the user manipulates the display area 2a of the cover panel 2 with a manipulator such as a finger, a signal corresponding to the manipulation is input from the touch panel 130 to the controller 100. The controller 100 identifies the contents of the manipulation performed on the display area 2a on the basis of a signal from the touch panel 130, thereby performing the processing corresponding to the contents.

The touch panel 130 according to one embodiment, whose high detection sensitivity is set high, can detect not only that the manipulator is in contact with the display area 2a but also that the manipulator is in proximity to the display area 2a while being away from the display area 2a by a predetermined distance or less. That is, the detection sensitivity of the touch panel 130 is set such that the touch panel 130 reacts when the distance between the display area 2a and the manipulator becomes equal to or less than a predetermined distance. The touch panel 130 accordingly can detect not only that the manipulator being in contact with the display area 2a departs from the display area 2a but also that the manipulator, which is in proximity to the display area 2a with a distance of a predetermined distance or less from the display area 2a, departs from the display area 2a such that the distance from the display area 2a exceeds the predetermined distance.

Throughout the specification, the manipulator being in proximity to the display area 2a means that the manipulator is in proximity to the display area 2a with a distance of a predetermined distance or less from the display area 2a, that is, that the manipulator is in proximity to the display area 2a such that the touch panel 130 reacts. In one embodiment, the manipulator departing from the display area 2a means not only that the manipulator being in contact with the display area 2a departs from the display area 2a but also that the manipulator, which is in proximity to the display area 2a with a distance of a predetermined distance or less from the area 2a, departs from the display area 2a such that the distance from the display area 2a exceeds the predetermined distance.

The key manipulation detecting module 140 can detect a manipulation of pressing down each manipulation key 5 by the user. The key manipulation detecting module 140 can detect whether each manipulation key 5 is pressed down (manipulated). When the manipulation key 5 is not pressed down, the key manipulation detecting module 140 outputs, to the controller 100, a non-manipulation signal indicating that the manipulation key 5 has not been manipulated. Contrastingly, when the manipulation key 5 is pressed down, the key manipulation detecting module 140 outputs, to the controller 100, a manipulation signal indicating that the manipulation key 5 has been manipulated. This allows the controller 100 to determine whether each manipulation key 5 has been manipulated.

When the key manipulation detecting module 140 detects that the home key 5a has been pressed down and then has been released, the controller 100 causes the display panel 120 to display the home screen (initial screen). This causes the display area 2a to display the home screen. When the key manipulation detecting module 140 detects that the menu key 5b has been pressed down and then has been released, the controller 100 causes the display panel 120 to display the option menu screen. Consequently, the option menu screen appears in the display area 2a. When the key manipulation detecting module 140 detects that the back key 5c has been pressed down and then has been released, the controller 100 causes the display panel 120 to return the display to the immediately preceding display. Consequently, the display of the display area 2a returns to the immediately preceding display.

The microphone 150 can convert a sound from the outside of the electronic apparatus 1 into an electrical sound signal and then output the sound signal to the controller 100. The sound from the outside of the electronic apparatus 1 is taken into the electronic apparatus 1 through the microphone hole 6 provided in the front surface of the cover panel 2 and is then input to the microphone 150.

The external speaker 170, which is, for example, a dynamic speaker, can convert an electrical sound signal from the controller 100 into a sound and then outputs the sound. The sound output from the external speaker 170 is output to the outside through the speaker holes 8 provided in the rear surface of the electronic apparatus 1. The sound output through the speaker holes 8 can be heard at a place apart from the electronic apparatus 1.

The front imaging module 180 is mainly formed of the imaging lens 180a and an imaging element. The front imaging module 180 can capture a static image and a moving image on the basis of the control by the controller 100. As illustrated in FIG. 1, the imaging lens 180a is provided on the front surface of the electronic apparatus 1. The front imaging module 180 can thus image an object located on the front side (the cover panel 2 side) of the electronic apparatus 1.

The rear imaging module 190 is mainly formed of the imaging lens 190a and an imaging element. The rear imaging module 190 can capture a static image and a dynamic image on the basis of the control by the controller 100. As illustrated in FIG. 2, the imaging lens 190a is provided on the rear surface of the electronic apparatus 1. The rear imaging module 190 can thus image an object located on the rear surface 10 side of the electronic apparatus 1.

The receiver 160 can output a received sound and is formed of, for example, a dynamic speaker. The receiver 160 can convert an electrical sound signal from the controller 100 into a sound and then output the sound. The sound output from the receiver 160 is output to the outside through the receiver hole 7 provided in the front surface of the electronic apparatus 1. The volume of the sound output through the receiver hole 7 is lower than the volume of the sound output through the speaker holes 8.

The battery 200 can output the power for the electronic apparatus 1. The power output from the battery 200 is supplied to electronic parts of the controller 100, the wireless communication module 110, and the like that are included in the electronic apparatus 1.

The storage module 103 stores various application programs 103b (hereinafter, merely referred to as "applications 103b"). The storage module 103 stores, for example, a telephone application for making a telephone call using a telephone function, a browser for displaying a website, a mail application for creating, reading, and transmitting and receiving an e-mail, and an address book application for reading and editing an address book (telephone book). Also, the storage module 103 stores a map display application for displaying a map, a moving image playback application for controlling playback of moving image data stored in the storage module 103, a static image display application for displaying static image data stored in the storage module 103, a music playback control application for controlling playback of music data stored in the storage module 103, and other application. When sound data is associated with moving image data, the moving image playback control application can simultaneously play back the moving image data and the sound data.

Throughout the specification, the moving image data associated with sound data and the data are referred to as "moving image data with sound," whereas the moving image data not associated with sound data is referred to as "soundless moving image data." The application 103b for data playback, such as a moving image playback control application and a music playback control application, may be referred to as a "data playback application."

When the controller 100 executing the main program 103a in the storage module 103 reads and executes the application 103b in the storage module 103, the controller 100 controls other components in the electronic apparatus 1, such as the wireless communication module 110, the display panel 120, and the receiver 160. This causes the electronic apparatus 1 to execute the function (processing) corresponding to the application 103b. For example, the controller 100 executing the telephone application controls the wireless communication module 110, the microphone 150, and the receiver 160. In the electronic apparatus 1, consequently, the receiver 160 outputs the voice included in the signal received by the wireless communication module 110, and the wireless communication module 110 transmits a transmission signal including the voice input to the microphone 150. In other words, the electronic apparatus 1 makes a telephone call with a communication partner apparatus using a telephone function.

<Types of Manipulations on Display Area>

Examples of the basic manipulations that the user performs on the display area 2a include sliding, tapping, and flicking.

Sliding is a manipulation in which the manipulator such as a finger moves while being in contact with or in proximity to the display area 2a. That is, sliding is a manipulation in which the manipulator moves in the display area 2a. The user slides the display area 2a, to thereby, for example, cause the electronic apparatus 1 to scroll the display of the display area 2a or switch a page currently appearing in the display area 2a to another page.

As described above, the manipulation in which the manipulator moves in the display area 2a include a manipulation in which the manipulator moves while being in contact with the display area 2a and a manipulation in which the manipulator moves while being in proximity to the display area 2a.

Tapping is a manipulation in which the manipulator departs from the display area 2a immediately after being brought into contact with or proximity to the display area 2a. Specifically, tapping is a manipulation in which the manipulator is brought into contact with or proximity to the display area 2a and then, within a predetermined period of time, departs from the display area 2a at the contact or proximity position. The user taps the display area 2a to select, for example, an application icon for executing the application 103b, which appears in the display area 2a, thereby causing the electronic apparatus 1 to execute the application 103b.

Flicking is a manipulation of flicking the display area 2a with the manipulator. Specifically, flicking is a manipulation in which the manipulator moves for a predetermined distance or more within a predetermined period of time while being in contact with or in proximity to the display area 2a and then departs from the display area 2a. The user flicks the display area 2a, to thereby, for example, cause the electronic apparatus 1 to scroll the display of the display area 2a in the moving direction of the manipulator in the flicking or switch the page currently appearing in the display area 2a to another page.

<Functional Blocks of Controller>

The execution of the main program 103a forms a plurality of functional blocks in the controller 100. FIG. 4 illustrates part of the plurality of functional blocks formed in the controller 100.

As illustrated in FIG. 4, the controller 100 includes an application executing module 210, a touch panel controller 220, a display controller 250, and a sound output controller 260 as the functional blocks.

When the instruction to execute the application 103b is input to the electronic apparatus 1 through the manipulation on the display area 2a by the user, the application executing module 210 can read and execute the application 103b in the storage module 103.

The touch panel controller 220 drives the touch panel 130 to cause the touch panel 130 to detect a manipulation on the display area 2a. The touch panel controller 220 identifies the contents of the manipulation detected by the touch panel 130 on the basis of an output signal from the touch panel 130.

The touch panel controller 220 includes a moving speed acquiring module 230 and a moving direction identifying module 240. When the touch panel 130 detects flicking, the moving speed acquiring module 230 can obtain the moving speed of the manipulator such as a finger in the flicking. Here, the moving speed is not a moving velocity. The moving speed refers to only the speed of movement and does not refer to the moving direction. The moving speed acquiring module 230 thus can obtain the speed of movement of the manipulator such as a finger in flicking. When the touch panel 130 detects flicking, the moving direction identifying module 240 can identify the moving direction of the manipulator such as a finger in the flicking. Throughout the specification, the moving speed of the manipulator in flicking may be referred to as a "flick speed." The moving direction of the manipulator in flicking may be referred to as a "flick direction." The direction of flicking refers to a flick direction.

The display controller 250 controls the display of the display panel 120 on the basis of, for example, a user manipulation detected by the touch panel 130, thereby causing the display panel 120 to display various information. This controls the display of the display area 2a.

The sound output controller 260 can control an output of the sound from the electronic apparatus 1. Specifically, the sound output controller 260 inputs sound signals to the receiver 160 and the external speaker 170. When an earphone is connected to the earphone terminal 9 (see FIGS. 1 and 2) provided on the lateral surface of the apparatus case 4, the sound output controller 260 inputs a sound signal to the earphone terminal 9. The sound signal input to the earphone terminal 9 is input to the earphone, and then, the sound is output from the earphone.

In the controller 100, during the execution of the data playback application by the application executing module 210, at least one of the display controller 250 and the sound output controller 260 functions as a data playback module that can play back data.

For example, during the execution of a music playback control application by the application executing module 210, the sound output controller 260 inputs a sound signal to the external speaker 170 or the earphone terminal 9 on the basis of the music data in the storage module 103, so that the music data is played back. That is, while the application executing module 210 is executing a music playback control application, the sound output controller 260 functions as a data playback module that can play back the music data in the storage module 103.

In the controller 100, when the application executing module 210 executes a moving image playback control application and when the data being a playback target is soundless moving image data, the display controller 250 controls the display panel 120 on the basis of the soundless moving image data, so that the soundless moving image data is played back. In this case, thus, the display controller 250 functions as a data playback module that can play back the soundless moving image data in the storage module 103.

In the controller 100, when the application executing module 210 is executing a moving image playback control application and when data being a playback target is moving image data with sound, the display controller 250 controls the display panel 120 on the basis of the moving image data with sound, and the sound output controller 260 inputs a sound signal to the external speaker 170 or the earphone terminal on the basis of the moving image data with sound, so that the moving image data with sound is played back. In this case, the display controller 250 and the sound output controller 260 function as a data playback module that can play back moving image data with sound in the storage module 103.

<Processing Executed in Detection of Flicking>

In one embodiment, upon detection of flicking by the touch panel 130, the processing to be executed by the controller 100 of the electronic apparatus 1 differs between when the flick speed of the flicking is smaller than a threshold and when the flick speed of the flicking is greater than the threshold. In other words, upon detection of flicking by the touch panel 130, the controller 100 functioning as a processing executing module can execute a first processing when the flick speed of the flicking is smaller than a threshold and can execute a second processing different from the first processing when the flick speed of the flicking is greater than the threshold. Consequently, the user varies the moving speed of the manipulator in flicking, thereby causing the electronic apparatus 1 to execute different processings. Therefore, the manipulation performance of the electronic apparatus 1 can be improved.

When the flick speed of the flicking detected by the touch panel 130 matches a threshold, the controller 100 can perform any of the first and second processings. In one embodiment, when the flick speed of the flicking detected by the touch panel 130 matches a threshold, the controller 100 performs the second processing.

Various specific examples of the first and second processings will be described below.

<Processing Example in Execution of Browser>

Figure 5:
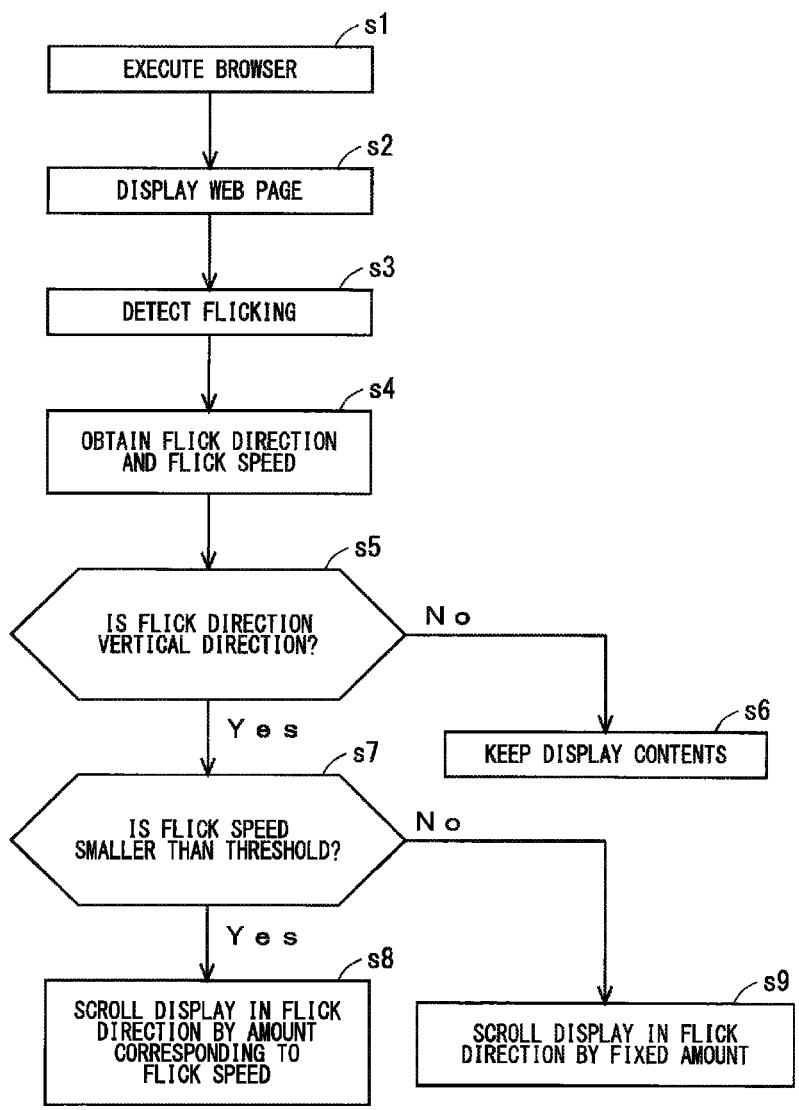
FIG. 5 illustrates a flowchart showing an operation of the electronic apparatus.

FIG. 5 illustrates a flowchart showing an operation of the electronic apparatus 1 when the touch panel 130 detects flicking during the execution of a browser by the electronic apparatus 1.

As illustrated in FIG. 5, in Step s1, the application executing module 210 executes a browser in the storage module 103. In Step s2, then, the controller 100 starts communicating with a web server being an access destination via the wireless communication module 110, thereby acquiring data indicative of a web page from the web server. In the controller 100, after the acquisition of the data indicative of a web page, the display controller 250 can control the display panel 120 to display the web page indicated by the data in the display panel 120. Consequently, a web page appears in the display area 2a.

While the web page appears in the display area 2a, in Step s3, the touch panel 130 detects flicking. In Step s4, subsequently, the moving direction identifying module 240 identifies the flick direction of the flicking, and the moving speed acquiring module 230 obtains the flick speed of the flicking.

After the execution of Step s4, in Step s5, the display controller 250 judges whether the flick direction identified in Step s4 is the vertical direction. When determining in Step s5 that the flick direction is not the vertical direction, the display controller 250 keeps the display of the display area 2a without changing the display of the display panel 120.

Meanwhile, when determining in Step s5 that the flick direction is the vertical direction, in Step s7, the display controller 250 determines whether the flick speed obtained in Step s4 is smaller than a threshold. When determining in Step s7 that the flick speed is smaller than the threshold, the display controller 250 controls the display panel 120 to scroll the display of the display area 2a in the flick direction (in the upward or downward direction) identified in Step s5 by an amount corresponding to the flick speed. In other words, the display controller 250 moves a display range of the web page being a display target, which appears in the display area 2a, by an amount corresponding to a flick speed in the flick direction (in the upward or downward direction). As a result, when the flick speed of the flicking detected by the touch panel 130 is smaller than a threshold, the scroll amount of the display in the display area 2a increases as the flick speed increases.

As described above, in the case where the browser is executed to display a web page, the first processing, which is executed when the touch panel 130 detects flicking whose flick speed is smaller than a threshold, is a processing of scrolling the display of the display area 2a by an amount corresponding to the flick speed of the flicking.

Meanwhile, when determining that the flick speed is not less than a threshold in Step s7, in Step s9, the display controller 250 controls the display panel 120 to scroll the display of the display area 2a by a fixed amount. For example, the display controller 250 scrolls the display of the display area 2a by an amount of one screen. The processing of Step s9 will be specifically described with reference to FIGS. 6 to 10.

Figure 6:
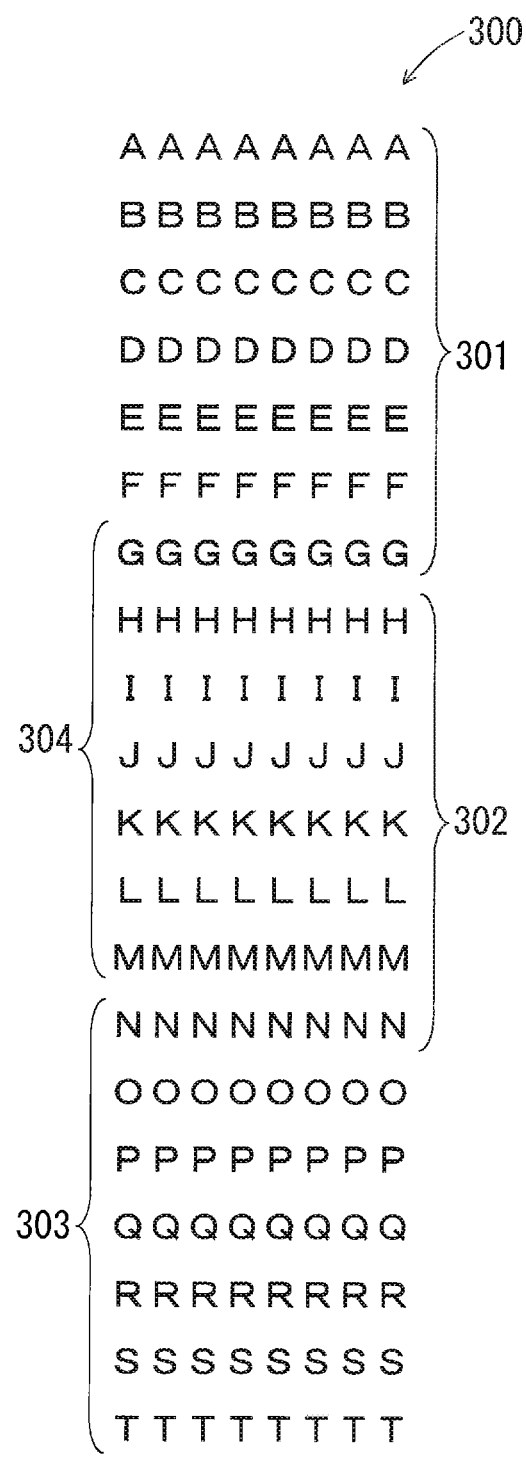
FIG. 6 illustrates an example web page.
Figure 7:
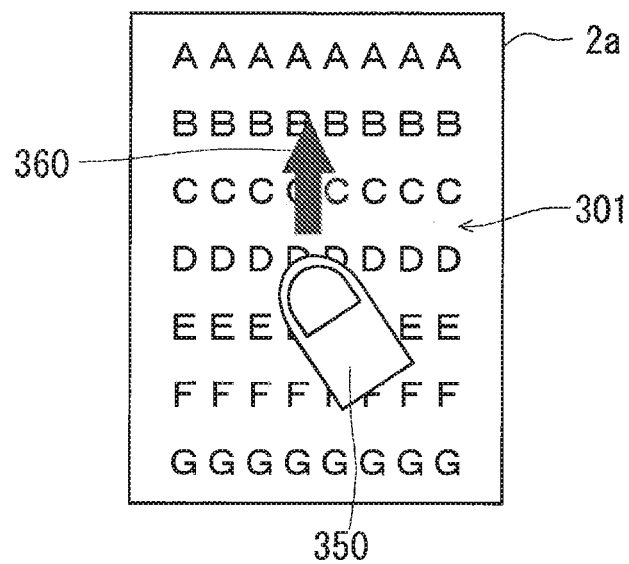
FIG. 7 illustrates a display example of the electronic apparatus.
Figure 8:
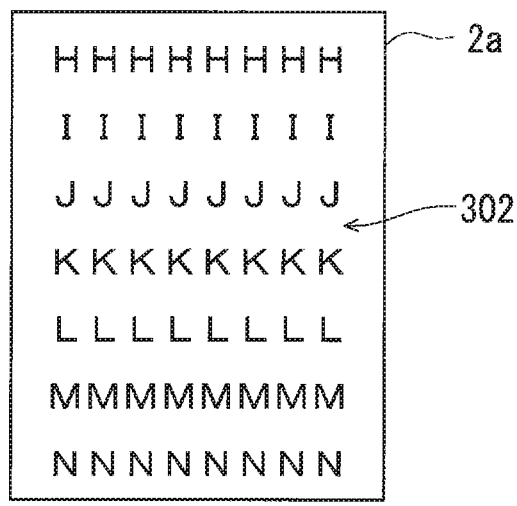
FIG. 8 illustrates a display example of the electronic apparatus.

FIG. 6 illustrates an example of a web page 300 being a display target. Considered here is a case where, as illustrated in FIG. 7, the user performs flicking in an upward direction 360 using his/her finger as a manipulator 350, while the display area 2a displays a portion 301 ranging from A to G in the web page 300. When the flick speed of the flicking is not less than a threshold, the display of the display area 2a illustrated in FIG. 7 is scrolled in the upward direction 360 by an amount of one screen. In this example, the display area 2a can display information for seven lines included in the web page 300, and thus, scrolling the display of the display area 2a by an amount of one screen causes the display of the display area 2a to be scrolled by seven lines in the web page 300. As a result, as illustrated in FIG. 8, a portion 302 ranging from H to N in the web page 300 appears in the display area 2a.

Figure 9:
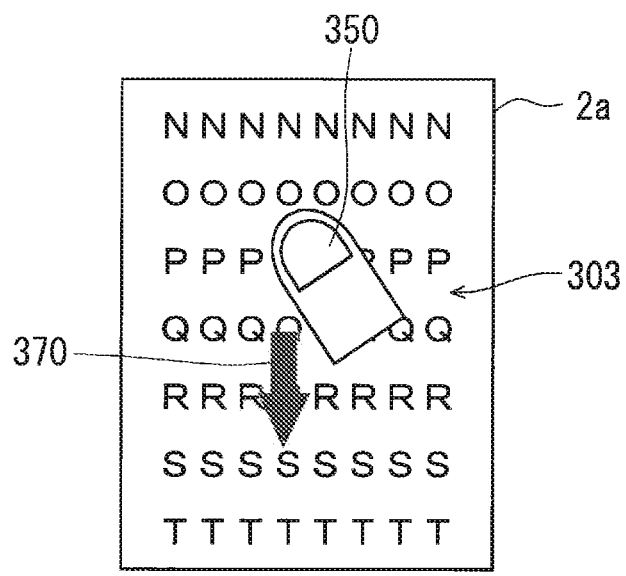
FIG. 9 illustrates a display example of the electronic apparatus.
Figure 10:
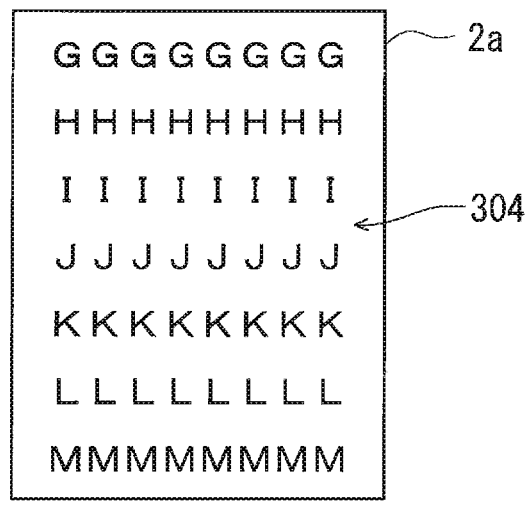
FIG. 10 illustrates a display example of the electronic apparatus.

Considered here is a case in which, as illustrated in FIG. 9, the user performs flicking in a downward direction 370 using the manipulator 350, while the display area 2a displays a portion 303 ranging from N to T in the web page 300. When the flick speed of the flicking is not less than a threshold, the display of the display area 2a illustrated in FIG. 9 is scrolled by an amount of one screen in the downward direction 370. As a result, as illustrated in FIG. 10, a portion 304 ranging from G to M in the web page 300 appears in the display area 2a.

As described above, in the case where the browser is executed to display a web page, the second processing, when the touch panel 130 detects flicking whose flick speed is not less than a threshold, is a processing of scrolling the display of the display area 2a by a fixed amount.

Unlike the examples of FIGS. 7 to 10, an area referred to as a pictarea, in which the information indicative of the status of the electronic apparatus 1 or the like appears, may be set in the display area 2a. In the pictarea are displayed an icon indicating a remaining battery life, an icon indicating a communication status, a current time, an icon for informing an occurrence of an event such as the reception of an e-mail and a missed call in the electronic apparatus 1. When a pictarea is set in the display area 2a, a web page appears in the portion other than the pictarea of the display area 2a, and only the display of the relevant portion is scrolled. When the flick speed of the flicking detected by the touch panel 130 is not less than a threshold and the display controller 250 scrolls the display of the display area 2a by an amount of one screen, the display of a scroll portion is scrolled by an amount of the size of the screen defined by the scroll portion (portion other than the pictarea) in which the display is scrolled in the display area 2a. In other words, "an amount of one screen" in one embodiment means an amount of the size of the screen defined by a scroll portion in which the display is scrolled in the display area 2a. When the entire display area 2a is a scroll portion as illustrated in FIGS. 7 to 10, "an amount of one screen" is accordingly an amount of the size of the screen formed of the entire display area 2a.

In one embodiment, when the touch panel 130 detects upward sliding on the display area 2a, the controller 100 scrolls the display of the display area 2a upward by an amount of movement of the manipulator in the sliding. Similarly, when the touch panel 130 detects downward sliding on the display area 2a, the controller 100 scrolls the display of the display area 2a downward by an amount of movement of the manipulator in the slide manipulation.

Figure 11:
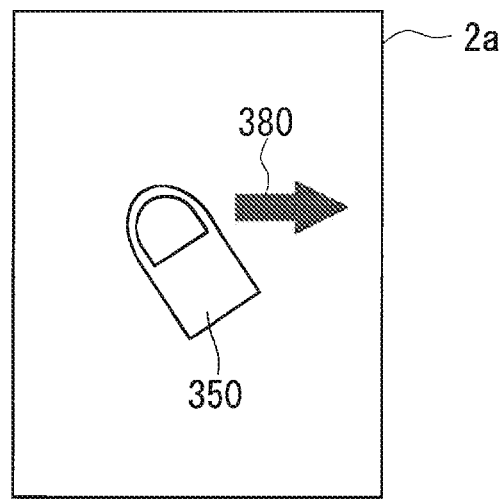
FIG. 11 illustrates rightward flicking on a display area.
Figure 12:
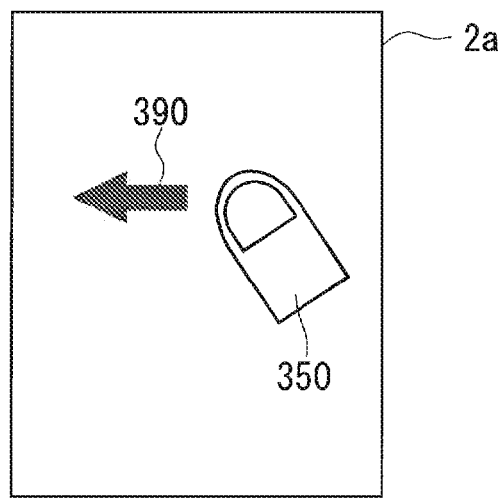
FIG. 12 illustrates leftward flicking on the display area.

The display controller 250 may change the display of the display area 2a when the touch panel 130 detects horizontal flicking as well as when the touch panel 130 detects vertical flicking. Alternatively, the display controller 250 may not change the display of the display area 2a when the touch panel 130 detects vertical flicking but may change the display of the display area 2a when the touch panel 130 detects horizontal flicking. FIG. 11 illustrates how the user performs flicking in a rightward direction 380 on the display area 2a with the manipulator 350. FIG. 12 illustrates how the user flicks the display area 2a in a leftward direction 390 with the manipulator 350. The following describes the processing of changing a display when the touch panel 130 detects horizontal flicking.

When a browser is executed in a personal computer so that a web page appears in a display apparatus connected with the personal computer, a fast-rewind button and a fast-forward button may appear together with the web page in the display apparatus. When the fast-rewind button is manipulated after a display processing of sequentially displaying a plurality of web pages, the web page, which has appeared immediately preceding the currently appearing web page in the display processing, appears again. Then, when the fast-rewind button appears again, the web page, which has appeared immediately preceding the currently appearing web page in the display processing, appears again. Meanwhile, when the fast-forward button is manipulated after the web page, which has appeared through the manipulation of the fast-rewind button, appears again, the web page, which has appeared immediately following the currently appearing web page in the display processing, appears again.

Figure 13:
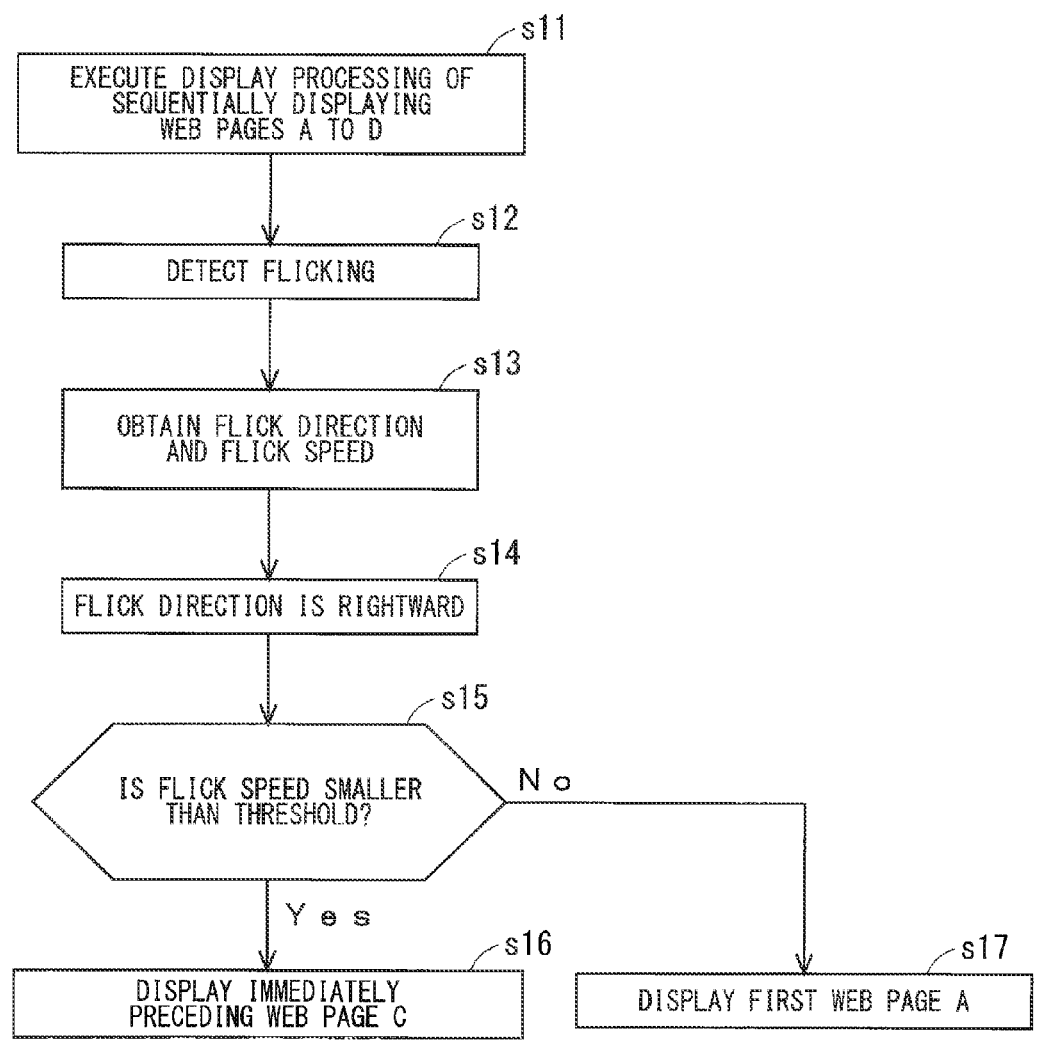
FIG. 13 illustrates a flowchart showing an operation of the electronic apparatus.

In one embodiment, rightward flicking corresponds to the manipulation of the fast-rewind button, and leftward flicking corresponds to the manipulation of the fast-forward button. FIG. 13 illustrates a flowchart showing an example operation of the electronic apparatus 1 when the touch panel 130 detects leftward flicking during the execution of a browser in the electronic apparatus 1.

As illustrated in FIG. 13, in Step s11, the display controller 250 controls the display panel 120 on the basis of the user manipulation detected by the touch panel 130 to perform a display processing of displaying web pages A to D in the display area 2a in the stated order.

While the web page D appears in the display area 2a, in Step s12, the touch panel 130 detects flicking. In Step s13, subsequently, the moving direction identifying module 240 identifies the flick direction of the flicking, and the moving speed acquiring module 230 obtains the flick speed of the flicking.

The display controller 250 determines that the flick direction identified in Step s13 is rightward in Step s14, and then, in Step s15, determines whether the flick speed obtained in Step s13 is smaller than a threshold. When determining that the flick speed is smaller than the threshold in Step s15, in Step s16, the display controller 250 display, in the display area 2a, the web page C that has appeared immediately preceding the currently appearing web page D in the display processing of Step s11.

When determining that the flick speed is not less than the threshold in Step s15, meanwhile, in Step s17, the display controller 250 displays, in the display area 2a, the web page A that has appeared first in the display processing of Step s11.

After Step s16, the touch panel 130 detects rightward flicking. When the flick speed of the flicking is smaller than the threshold, the display controller 250 displays, in the display area 2a, the web page B that has appeared immediately preceding the currently appearing web page C in the display processing of Step s11. After that, when the touch panel 130 continuously detects rightward flicking whose flick speed is smaller than the threshold, the web pages that have appeared in the display processing of Step s11 retroactively appear in order.

After Step s16, the touch panel 130 detects rightward flicking. When the flick speed of the flicking is not less than the threshold, as in Step s17, the display controller 250 displays, in the display area 2a, the web page A that has appeared first in the display processing of Step s11.

As described above, the display processing of sequentially displaying a plurality of web pages in the display area 2a is executed during the execution of the browser and, when the touch panel 130 detects rightward flicking while one of the plurality of web pages appears in the display area 2a, the display controller 250 can execute a processing as follows. When the flick speed of the flicking is smaller than the threshold, the display controller 250 can execute, as a first processing, the processing of controlling the display panel 120 to display, in the display area, the web page that has appeared immediately preceding the one web page in the display processing. Meanwhile, when the flick speed of the flicking is not less than the threshold, the display controller 250 can execute, as a second processing, the processing of controlling the display panel 120 to display, in the display area 2a, the web page that has appeared first in the display processing.

Figure 14:
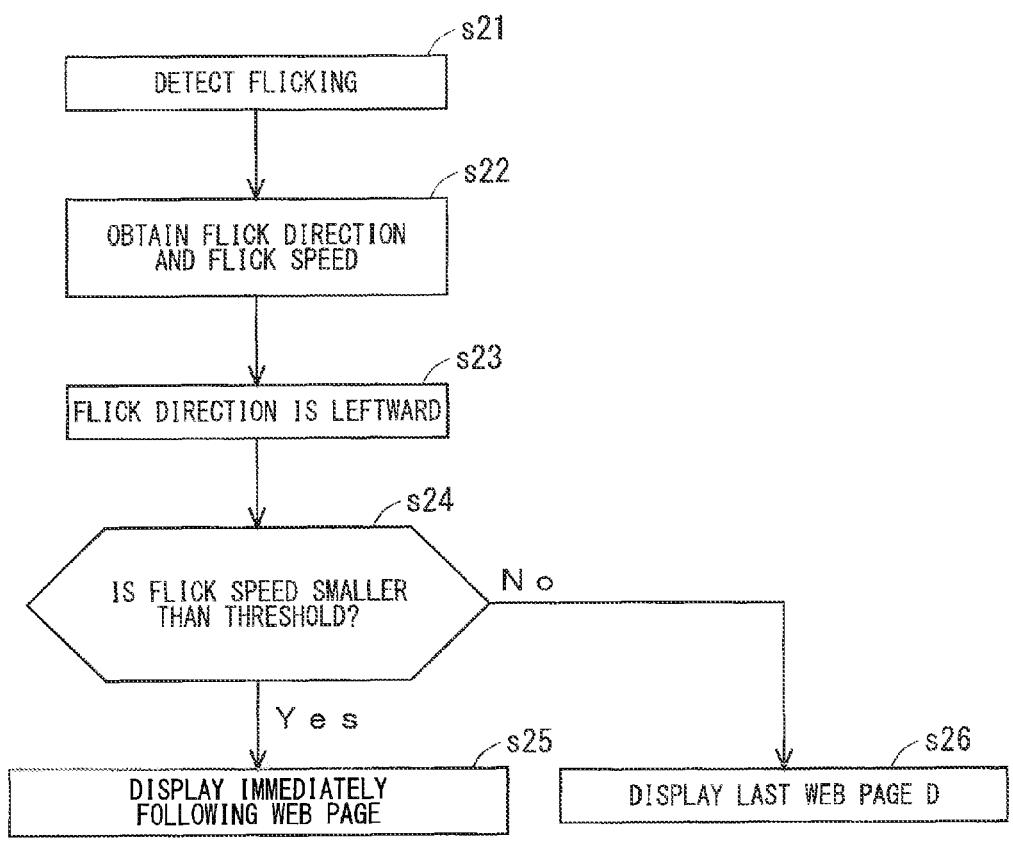
FIG. 14 illustrates a flowchart showing an operation of the electronic apparatus.

FIG. 14 illustrates a flowchart showing an example operation of the electronic apparatus 1 when the touch panel 130 detects leftward flicking during the execution of the browser in the electronic apparatus 1. After the execution of the display processing of Step s11, rightward flicking is performed on the touch panel 130 and one of the web pages A to D appears in the display area 2a. In this state, in Step s21, the touch panel 130 detects flicking. In Step s22, then, the moving direction identifying module 240 identifies the flick direction of the flicking, and the moving speed acquiring module 230 obtains the flick speed of the flicking.

In Step s23, then, the display controller 250 determines that the flick direction identified in Step s22 is leftward. In Step s24, subsequently, the display controller 250 determines whether the flick speed obtained in Step s22 is smaller than a threshold. When determining that the flick speed is smaller than the threshold in Step s24, in Step s25, the display controller 250 displays, in the display area 2a, the web page that has appeared immediately following the currently appearing web page in the display processing of Step s11. For example, if the currently appearing web page is the web page B, the web page C, which has appeared immediately following the web page B in the display processing of Step s11, appears in the display area 2a.

When determining that the flick speed is not less than the threshold in Step s24, in Step s26, the display controller 250 displays, in the display area 2a, the web page D that has appeared last in the display processing of Step s11.

After Step s25, when the touch panel 130 detects leftward flicking and the flick speed of the flicking is smaller than the threshold, the display controller 250 displays, in the display area 2a, the web page that has appeared immediately following the currently appearing web page in the display processing of Step s11.

After Step s25, when the touch panel 130 detects leftward flicking and the flick speed of the flicking is not less than the threshold, as in Step s26, the display controller 250 displays, in the display area 2a, the web page D that has appeared last in the display processing of Step s11.

As described above, the display processing of sequentially displaying a plurality of web pages in the display area 2a is executed during the execution of the browser and, when the touch panel 130 detects leftward flicking while one of the plurality of web pages appears in the display area 2a, the display controller 250 can perform a processing as follows. When the flick speed of the flicking is smaller than a threshold, the display controller 250 can perform, as a first processing, the processing of controlling the display panel 120 to display, in the display area 2a, the web page that has appeared following the one web page in the display processing. Meanwhile, when the flick speed of the flicking is not less than the threshold, the display controller 250 can execute, as a second processing, the processing of controlling the display panel 120 to display, in the display area 2a, the web page that has appeared last in the display processing.

As described above, in one embodiment, the user can cause the electronic apparatus 1 to change the display change processing executed in the electronic apparatus 1 by merely changing the moving speed of the manipulator in flicking. Therefore, the manipulation performance of the electronic apparatus 1 can be improved.

Unlike one embodiment, in the case where upon the detection of flicking by the touch panel 130, the display of the display area 2a is always scrolled by an amount corresponding to the flick speed of the flicking irrespective of whether the flick speed of the flicking is smaller than a threshold, if the flick speed of the flicking detected by the touch panel 130 is high, up to which position the display of the display area 2a has been scrolled may be difficult to grasp.

In one embodiment, contrastingly, when the flick speed of the flicking detected by the touch panel 130 is greater than the threshold, the display of the display area 2a is scrolled by a fixed amount. This prevents or reduces a situation where up to which position the display of the display area 2a has been scrolled is difficult to grasp. The manipulation performance when the display of the electronic apparatus 1 is changed can therefore be improved.

The maximum value of the scroll amount of the display of the display area 2a when the flick speed of the flicking detected by the touch panel 130 is smaller than a threshold may be equal to or smaller or greater than the scroll amount (in the example above, an amount of one screen) of the display of the display area 2a when the flick speed is not less than the threshold.

<Processing Example During Execution of Mail Application>

The following describes the processing executed by the controller 100 when a mail application is executed and then the touch panel 130 detects flicking while an incoming mail or an outgoing mail appears in the display area 2a.

Figure 15:
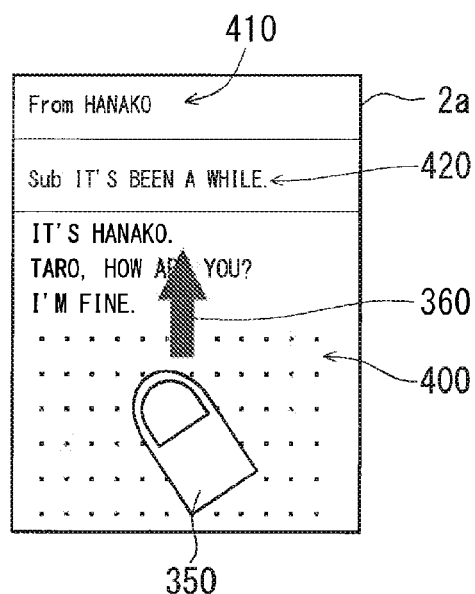
FIG. 15 illustrates a display example of the electronic apparatus.

FIG. 15 illustrates a display example of an incoming mail. As illustrated in FIG. 15, when an incoming mail appears in the display area 2a, a name 410 of the transmitter of the incoming mail and a subject 420 of the incoming mail appear together with a body 400 of the incoming mail. When the touch panel 130 detects vertical flicking while an incoming mail appears in the display area 2a, the controller 100 scrolls the display of the display area 2a as in the case where a web page appears in the display area 2a.

In the case where flicking in the upward direction 360 is performed on the display area 2a with the manipulator 350a as illustrated in FIG. 15 while an incoming mail appears in the display area 2a, when the flick speed of the flicking is smaller than a threshold, the display controller 250 controls the display panel 120 to scroll the display of the display area 2a upward by an amount corresponding to the flick speed. Meanwhile, when the flick speed of the flicking is not less than the threshold, the display controller 250 controls the display panel 120 to scroll the display of the display area 2a upward by an amount of one screen.

In the case where the touch panel 130 detects downward flicking where an incoming mail appears in the display area 2a, when the flick speed of the downward flicking is smaller than a threshold, the display controller 250 controls the display panel 120 to scroll the display of the display area 2a downward by an amount corresponding to the flick speed. Meanwhile, when the flick speed of the flicking is not less than the threshold, the display controller 250 controls the display panel 120 to scroll the display of the display area 2*a* downward by an amount of one screen.

The controller 100 operates as described above also when the touch panel 130 detects vertical flicking during the display of, for example, a body of an outgoing mail in the display area 2*a*.

As described above, when the touch panel 130 detects flicking whose flick speed is smaller than a threshold during the display of an email, the display controller 250 can execute, as a first processing, the processing of scrolling the display of the display area 2*a* by an amount corresponding to the flick speed. Meanwhile, when the touch panel 130 detects flicking whose flick speed is not less than the threshold during the display of an email, the display controller 250 can execute, as a second processing, the processing of scrolling the display of the display area 2*a* by a fixed amount.

As in the case where a web page appears, also in the case where an email appears, the display controller 250 may change the display of the display area 2*a* not only when the touch panel 130 detects vertical flicking but also when the touch panel 130 detects horizontal flicking, or only when the touch panel 130 detects vertical flicking. The following describes the processing when the touch panel 130 detects horizontal flicking during the display of an email.

Figure 16:
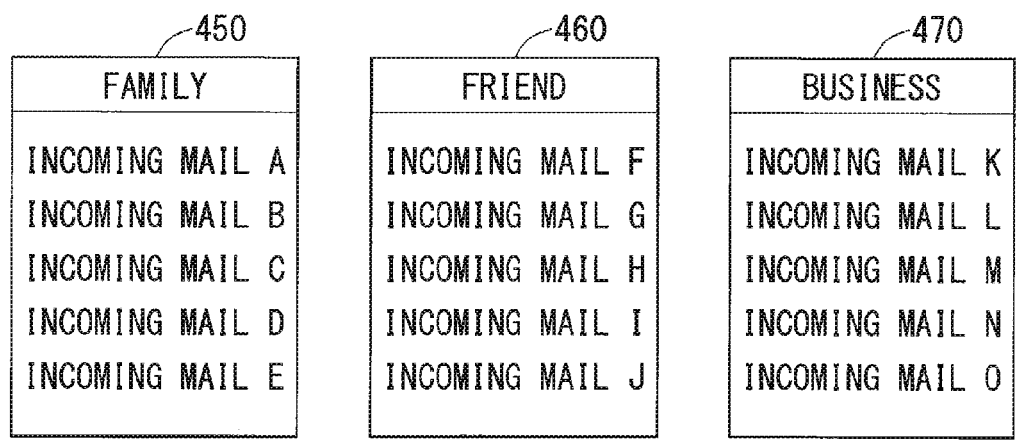
FIG. 16 illustrates an example of a plurality of folders storing incoming mails.

In one embodiment, the user can manipulate the display area 2*a* to create a plurality of folders for saving (storing) emails in the storage module 103. FIG. 16 illustrates an example of a plurality of folders for saving incoming mails. In the example illustrated in FIG. 16, a family folder 450 for saving incoming mails being a type of data, which has a folder name "family," a friend folder 460 having a folder name "friend," and a business folder 470 having a folder name "business" are created in the storage module 103. The family folder 450 saves incoming mails A to E from a family. The friend folder 460 saves incoming mails F to J from friends. The business folder 470 saves business-related incoming mails K to O.

In this example, the order used in the determination of an incoming mail in the family folder 450, which will appear next when horizontal flicking is detected where an incoming mail in the family folder 450 appears, is set for the incoming mails A to E in the family folder 450. In this example, the incoming mails A to E are numbered starting from one in a reverse chronological order of, for example, reception date and time. Of the incoming mails A to E, a mail with the newest data and time is placed first and a mail with the oldest data and time is placed last. In this example, the reception date and time is newer in the order of the incoming mails A to E.

The same holds true for the incoming mails F to J in the friend folder 460, where the incoming mails F to J are sequentially numbered starting from one in a reverse chronological order of, for example, reception date and time. Of the incoming mails F to J, accordingly, a mail with the newest reception date and time is placed first, and a mail with the oldest reception date and time is placed last. In this example, the reception date and time of reception is newer in the order of the incoming mails F to J.

The same holds true for the incoming mails K to O in the business folder 470, where the incoming mails K to O are sequentially numbered starting from one in a reverse chronological order of, for example, reception date and time. In this example, the reception date and time is newer in the order of the incoming mails K to O.

FIG. 17 illustrates a flowchart showing an operation of the electronic apparatus 1 when rightward flicking is detected while an incoming mail in the family folder 450 appears.

As illustrated in FIG. 17, in Step s31, the touch panel 130 detects flicking while an incoming mail in the family folder 450 appears. In Step s32, then, the moving direction identifying module 240 identifies the flick direction of the flicking, and the moving speed acquiring module 230 obtains the flick speed of the flicking.

In Step s33, then, the display controller 250 determines that the flick direction identified in Step s32 is rightward. In Step s34, then, the display controller 250 determines whether the flick speed obtained in Step s32 is smaller than a threshold. When determining that the flick speed is smaller than the threshold in Step s34, in Step s35, the display controller 250 controls the display panel 120 to display in the display area 2*a*, for example, the body of the incoming mail immediately preceding the incoming mail currently appearing in the family folder 450. For example, if the currently appearing incoming mail is the incoming mail D in the family folder 450, the incoming mail C immediately preceding the incoming mail D in the family folder 450 appears in the display area 2*a*.

Meanwhile, when determining that the flick speed is not less than the threshold in Step s34, in Step s36, the display controller 250 displays the first incoming mail A in the family folder 450.

After Step s35, when the flick speed of rightward flicking, which has been detected by the touch panel 130, is smaller than the threshold, the display controller 250 displays, in the display area 2*a*, an incoming mail immediately preceding the incoming mail currently appearing in the family folder 450. After that, when the touch panel 130 sequentially detects rightward flicking whose flick speed is smaller than the threshold, the incoming mails in the family folder 450 retroactively appear in the display area 2*a*.

After Step s35, when the flick speed of rightward flicking, which has been detected by the touch panel 130, is not less than the threshold, as in Step s36, the display controller 250 displays, in the display area 2*a*, the first incoming mail A in the family folder 450.

The controller 100 operates as described above when the touch panel 130 detects rightward flicking where an incoming mail included in the plurality of incoming mails F to J in the friend folder 460 appears and, when the touch panel 130 detects rightward flicking where an incoming mail included in the plurality of incoming mails K to O in the business folder 470 appears. The same holds true for the case where a plurality of folders for storing outgoing mails are provided.

FIG. 18 illustrates a flowchart showing an operation of the electronic apparatus 1 when leftward flicking is detected where, for example, the body of an incoming mail in the family folder 450 appears.

As illustrated in FIG. 18, in Step s41, the touch panel 130 detects flicking where an incoming mail in the family folder 450 appears. In Step s42, then, the moving direction identifying module 240 identifies the flick direction of the flicking, and the moving speed acquiring module 230 obtains the flick speed of the flicking.

In Step s43, then, the display controller 250 determines that the flick direction identified in Step s42 is leftward, and subsequently in Step s44, the display controller 250 determines whether the flick speed obtained in Step s42 is smaller than a threshold. When determining that the flick speed is smaller than the threshold in Step s44, in Step s45, the display controller 250 controls the display panel 120 to display in the display area 2a, for example, the body of an incoming mail immediately following the incoming mail currently appearing in the family folder 45. For example, if the currently appearing incoming mail is the incoming mail B in the family folder 450, the incoming mail C immediately following the incoming mail B in the family folder 450 appears in the display area 2a.

When determining that the flick speed is not less than the threshold in Step s44, in Step s36, the display controller 250 displays the last incoming mail E in the family folder 450.

After Step s45, when the flick speed of leftward flicking, which has been detected by the touch panel 130, is smaller than a threshold, the display controller 250 displays, in the display area 2a, an incoming mail immediately following the incoming mail currently appearing in the family folder 450. After that, when the touch panel 130 continuously detects leftward flicking whose flick speed is smaller than a threshold, the incoming mails in the family folder 450 sequentially appear in the display area 2a.

After Step s45, when the flick speed of leftward flicking, which has been detected by the touch panel 130, is not less than the threshold, as in Step s46, the display controller 250 displays, in the display area 2a, the last incoming mail E in the family folder 450.

The controller 100 operates as described above when the touch panel 130 detects leftward flicking while an incoming mail included in the plurality of incoming mails F to J in the friend folder 460 appears, and when the touch panel 130 detects leftward flicking while an incoming mails included in the plurality of incoming mails K to O in the business folder 470 appears. The same holds true for the case where a plurality of folders for saving ongoing mails are provided.

As described above, in the case where the touch panel 130 detects flicking while the data included in a plurality of pieces of data (such as received data and transmission data) whose order has been determined appears, the display controller 250 can execute a processing as follows. When the flick speed of the flicking is smaller than a threshold, the display controller 250 can execute, as a first processing, the processing of controlling the display panel 120 to display, in the display area 2a, one of the pieces of data preceding and following the data currently appearing in the display area 2a. Meanwhile, when the flick speed of the flicking is not less than the threshold, the display controller 250 can execute, as a second processing, the processing of controlling the display panel 120 to display, in the display area 2a, one of the first data and the last data out of the plurality of pieces of data. This enables the user to slowly flick the display area 2a to operate the electronic apparatus 1 such that pieces of data appearing in the display area 2a change sequentially. This also enables the user to quickly flick the display area 2a to operate the electronic apparatus 1 such that the first or last data appears.

In the determined order of a plurality of folders saving data, the display controller 250 may operate differently from the above when the touch panel 130 detects flicking while data in one folder out of the plurality of folders appears in the display area 2a. In other words, in such a case, when the flick speed of the flicking is smaller than a threshold, the display controller 250 may display, in the display area 2a, one of the pieces of data preceding and following the data within the folder saving data appearing in the display area 2a. Meanwhile, when the flick speed of the flicking is not less than the threshold, the display controller 250 may display, in the display area 2a, the data in one of the folders preceding and following the folder saving the data appearing in the display area 2a. The following describes a specific example of the above.

For example, in the case where the family folder 450 is the first folder, the friend folder 460 is the second folder, and the business folder 470 is the last folder, the incoming mail H in the friend folder 460 appears in the display area 2a. In such a case, when the touch panel 130 detects leftward flicking whose flick speed is smaller than a threshold, the display controller 250 displays, in the display area 2a, the incoming mail I following the incoming mail H in the friend folder 460. Meanwhile, when the touch panel 130 detects leftward flicking whose flick speed is not less than the threshold, the display controller 250 displays, in the display area 2a, an incoming mail in the business folder 470 following the friend folder 460, for example, the first incoming mail K.

When the touch panel 130 detects rightward flicking whose flick speed is smaller than a threshold, the display controller 250 displays, in the display area 2a, the incoming mail G preceding the incoming mail H in the friend folder 460. Meanwhile, when the touch panel 130 detects rightward flicking whose flick speed is not less than the threshold, the display controller 250 displays, in the display area 2a, an incoming mail in the family folder 450 preceding the friend folder 460, for example, the first incoming mail A.

When the electronic apparatus 1 operates as described above, the user can quickly perform flicking to operate the electronic apparatus 1 such that the data in one of the folders preceding and following the folder storing the data appearing in the display area 2a appears in the display area 2a.

<Processing Example During Execution of Address Book Application>

Described next is the processing executed by the controller 100 when the touch panel 130 detects flicking while the display area 2a displays an address book (telephone book) as a result of the execution of an address book application.

The storage module 103 can store an address book containing a plurality of pieces of personal information. Each personal information contains, for example, a name, kana (Japanese syllabic scripts) of the name, a telephone number, and an email address. When the address book appears in the display area 2a, for example, the names contained in a plurality of pieces of personal information constituting an address book are arranged in the order of Japanese alphabet to constitute a list page, and the list page appears in the display area 2a. This allows the list of personal information of the address book to appear in the display area 2a. Herein, the Japanese alphabet is a Japanese syllabary, where 47 Japanese syllables are arranged by ten lines of five characters.

Figure 19:
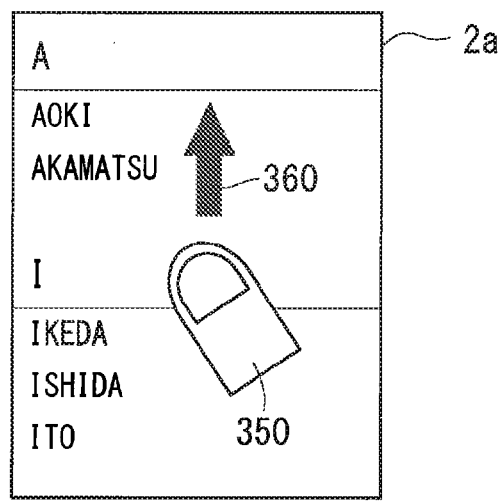
FIG. 19 illustrates a display example of the electronic apparatus.
Figure 20:
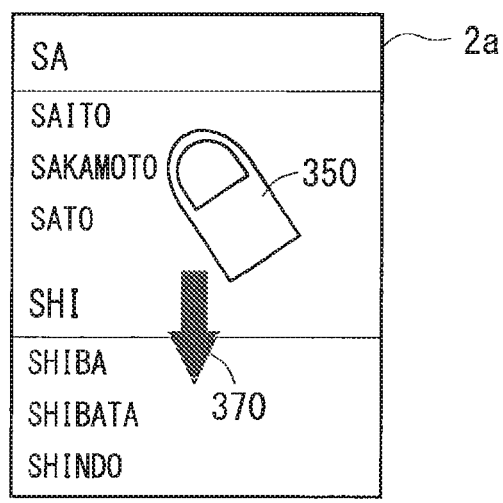
FIG. 20 illustrates a display example of the electronic apparatus.

FIG. 19 illustrates a display example of a list of personal information of an address book. As illustrated in FIG. 19, when an area of the display area 2a in which a name appears is tapped while the list of personal information of an address book appears in the display area 2a, the details of the personal information containing the name appear in the display area 2a. The details of the personal information include a name, kana of the name, a telephone number, and an email address. When the touch panel 130 detects vertical flicking while the list of personal information of an address book appearing, the controller 100 scrolls the display of the display area 2a as in the case where a web page or the like appears in the display area 2a. FIG. 20 illustrates the display of the display area 2a after the display of the display area 2a illustrated in FIG. 19 is scrolled upward.

While the list of personal information of an address book appears in the display area 2a, as illustrated in FIG. 19, flicking in the upward direction 360 is performed on the display area 2a with the manipulator 350. In this case, when the flick speed of the flicking is smaller than a threshold, the display controller 250 controls the display panel 120 to scroll the display of the display area 2a upward by an amount corresponding to the flick speed. Meanwhile, when the flick speed of the flicking is not less than the threshold, the display controller 250 controls the display panel 120 to scroll the display of the display area 2a upward by an amount of one screen.

While the list of personal information of an address book appears in the display area 2a, as illustrated in FIG. 20, flicking in the downward direction 370 is performed on the display area 2a with the manipulator 350. In this case, when the flick speed of the flicking is smaller than the threshold, the display controller 250 controls the display panel 120 to scroll the display of the display area 2a downward by an amount corresponding to the flick speed. Meanwhile, when the flick speed of the flicking is not less than the threshold, the display controller 250 controls the display panel 120 to scroll the display of the display area 2a downward by an amount of one screen.

When an address book appears in the display area 2a, unlike the above description, a page containing only the names having the same leading kana character may be formed per category of the leading kana character of a name. In this case, the electronic apparatus 1 is operated such that the page is switched by horizontal flicking. This allows the names registered with an address book to appear per category of the leading kana character of a name.

Figure 21:
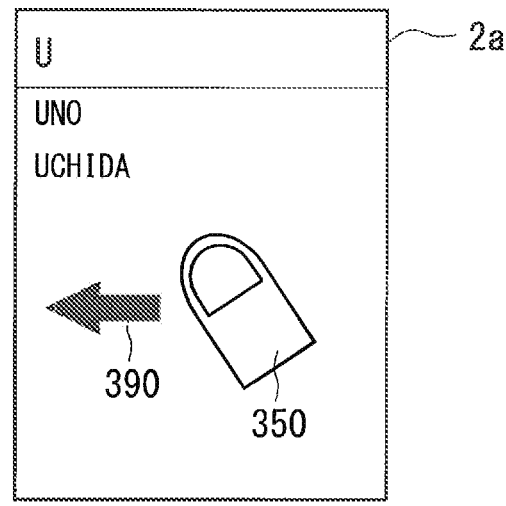
FIG. 21 illustrates a display example of the electronic apparatus.
Figure 22:
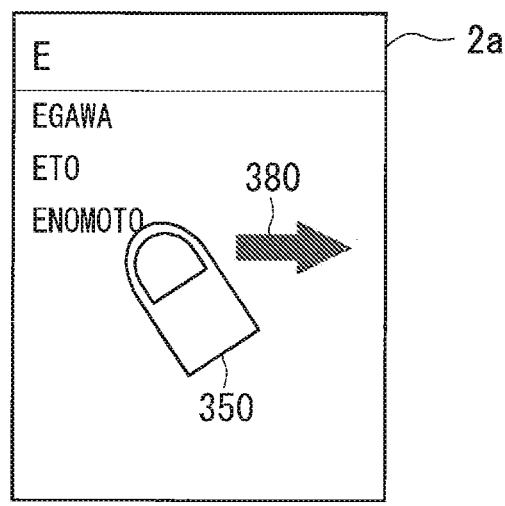
FIG. 22 illustrates a display example of the electronic apparatus.

FIG. 21 illustrates how names whose leading kana character (initial) is "U" appear, which are contained in a plurality of pieces of personal information registered with the address book. That is, FIG. 21 illustrates how the names appear, which are the data associated with kana character "U," contained in the address book. FIG. 22 illustrates how the names whose leading kana is "E" appear, which are contained in a plurality of pieces of personal information registered with the address book. That is, FIG. 22 illustrates how the names appear, which are the data associated with kana character "E," contained in the address book.

As described above, even in the case where the names of personal information appear per category of the leading kana character, when the area of the display area 2a in which a name appears is tapped, details of the personal information containing the name appear in the display area 2a. The details include a name contained in the personal information, kana of the name, a telephone number, and an email address.

While the names whose leading character (initial) is a specific kana character appear in the display area 2a, as illustrated in FIG. 21, flicking in the leftward direction 390 is performed on the display area 2a with the manipulator 350. In this case, when the flick speed of the flicking is smaller than the threshold, the display controller 250 displays, in the display area 2a, the names whose leading kana character is the kana character following the specific kana character in the order of Japanese alphabet. Meanwhile, when the flick speed of the flicking is not less than the threshold, the display controller 250 displays the names whose leading kana character is the kana character contained in a line following the line containing the specific kana character in the order of Japanese alphabet, for example, the leading kana character of the following line.

Figure 23:
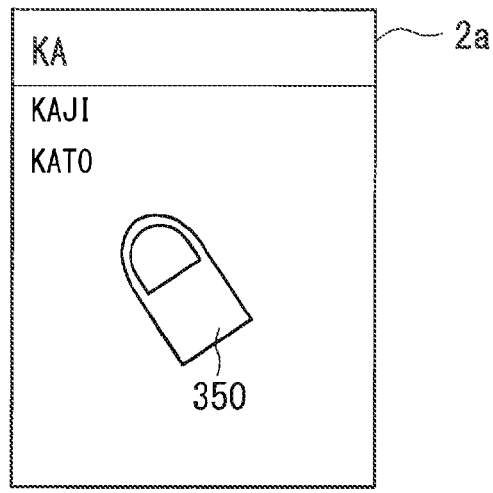
FIG. 23 illustrates a display example of the electronic apparatus.

For example, as illustrated in FIG. 21, when the touch panel 130 detects leftward flicking whose flick speed is smaller than a threshold while the names whose leading character is kana "U" appear, as illustrated in FIG. 22, the names whose leading character is "E" following "U" in the order of Japanese alphabet appear. When the touch panel 130 detects leftward flicking whose flick speed is not less than the threshold while the names whose leading character is kana "U" appear, as illustrated in FIG. 23, the names whose leading character is "KA," which is the first kana character of the "line KA" following the "line A" containing "U," appear.

As illustrated in FIG. 22, flicking in the rightward direction 380 is performed on the display area 2a with the manipulator 350 while the names whose leading character is a specific kana character appear in the display area 2a. In this case, when the flick speed of the flicking is smaller than the threshold, the display controller 250 displays, in the display area 2a, the names whose leading character is a kana character preceding the specific kana character. Meanwhile, when flick speed of the flicking is not less than the threshold, the display controller 250 displays the names whose leading character is a kana contained in a line preceding the line containing the specific kana character in the order of Japanese alphabet, for example, the leading kana character of the line.

Figure 24:
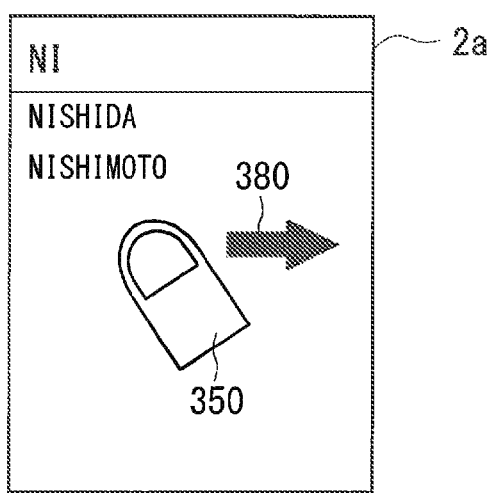
FIG. 24 illustrates a display example of the electronic apparatus.

For example, as illustrated in FIG. 24, when the touch panel 130 detects flicking in the rightward direction 380 whose flick speed is smaller than a threshold while the names whose leading character is kana "NI" appear, as illustrated in FIG. 25, the names whose leading character is kana "NA" preceding "NI" in the order of Japanese alphabet appear. When the touch panel 130 detects rightward flicking whose flick speed is not less than the threshold while the names whose leading character is "NI" appear, as illustrated in FIG. 26, the names, whose leading character is kana "TA" being the first kana character in the "line NA" including "NI" in the order of Japanese alphabet, appear.

As described above, when the touch panel 130 detects flicking whose flick speed is smaller than a threshold while the data associated with a specific kana character contained in Japanese alphabet appears in the display area 2a, the display controller 250 can execute, as a first processing, the processing of displaying, in the display area 2a, the data associated with one of the kana characters preceding and following the kana character associated with the data appearing in the display area 2a in Japanese alphabet.

Meanwhile, when the touch panel 130 detects flicking whose flick speed is not less than the threshold while the data associated with a specific kana character contained in Japanese alphabet appears in the display area 2a, the display controller 250 can execute, as a second processing, the processing of displaying, in the display area 2a, the data associated with a kana character contained in one of the lines preceding and following the line containing the kana character associated with the data in the display area 2a.

Figure 27:
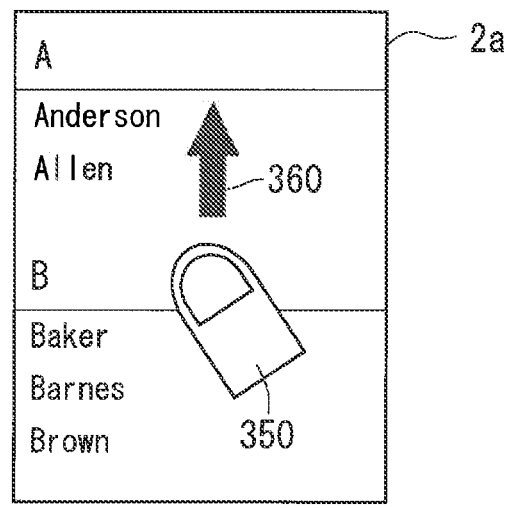
FIG. 27 illustrates a display example of the electronic apparatus.

The names contained in the address book are written in Chinese characters in the example above, which may be written in Latin characters (Roman characters). In this case, one list page composed of the names individually contained in a plurality of pieces of personal information constituting an address book, which are arranged in an alphabetic order, appears in the display area 2a. FIG. 27 illustrates a display example of a list of personal information of an address book in this case.

Figure 28:
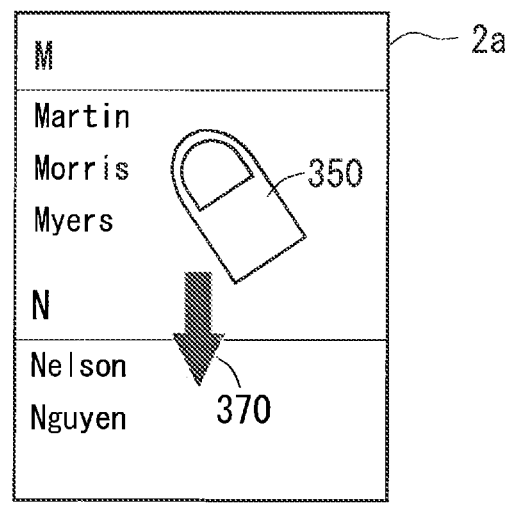
FIG. 28 illustrates a display example of the electronic apparatus.

With reference to FIG. 27, the names whose leading character is "A" of the alphabet composed of Latin characters and the names whose leading character is "B" of the alphabet appear in the display area 2a. When the touch panel 130 detects vertical flicking while a list of personal information of an address book appears, the controller 100 scrolls the display of the display area 2*a*. FIG. 28 illustrates the display of the display area 2*a* after the display of the display area 2*a* illustrated in FIG. 27 has been scrolled upward.

As illustrated in FIG. 27, flicking in the upward direction 360 is performed on the display area 2*a* with the manipulator 350 while a list of personal information of an address book appears in the display area 2*a*. In this case, when the flick speed of the flicking is smaller than the threshold, the display controller 250 controls the display panel 120 to scroll the display of the display area 2*a* upward by an amount corresponding to the flick speed. Meanwhile, when flick speed of the flicking is not less than the threshold, the display controller 250 controls the display panel 120 to scroll the display of the display area 2*a* upward by an amount of one screen.

As illustrated in FIG. 28, flicking in the downward direction 370 is performed on the display area 2*a* with the manipulator 350 while a list of personal information of an address book appears in the display area 2*a*. In this case, when the flick speed of the flicking is smaller than a threshold, the display controller 250 controls the display panel 120 to scroll the display of the display area 2*a* downward by an amount corresponding to the flick speed. Meanwhile, when the flick speed of the flicking is not less than the threshold, the display controller 250 controls the display panel 120 to scroll the display of the display area 2*a* downward by an amount of one screen.

When an address book appears in the display area 2*a*, a page containing only the names having the same leading character may be formed per type of the leading character (Latin character) of a name written in Latin characters. In this case, the electronic apparatus 1 is operated such that the page is switched by horizontal flicking. This allows the names registered with an address book to appear per category of the leading character of a name.

FIG. 29 illustrates how names whose leading character is "G" appear. FIG. 30 illustrates how names whose leading character is "H" appear. As illustrated in FIG. 29, flicking in the leftward direction 390 is performed on the display area 2*a* with the manipulator 350 while the names whose leading character (initial) is a specific character appear in the display area 2*a*. In this case, when the flick speed of the flicking is smaller than a threshold, the display controller 250 displays, in the display area 2*a*, names whose leading character is a character immediately following the specific character. Meanwhile, when the flick speed of the flicking is not less than the threshold, the display controller 250 displays the names whose leading character is several characters after the specific character.

Figure 31:
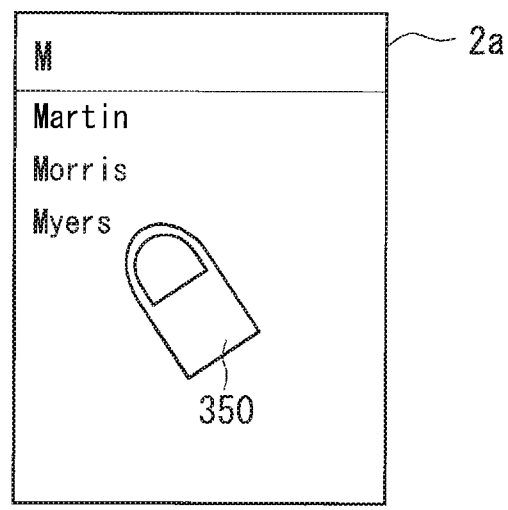
FIG. 31 illustrates a display example of the electronic apparatus.

For example, as illustrated in FIG. 29, when the touch panel 130 detects leftward flicking whose flick speed is smaller than a threshold while the names whose leading character is "G" appear, as illustrated in FIG. 30, the names whose leading character is "H" following "G" in alphabet appear. When the touch panel 130 detects leftward flicking whose flick speed is not less than the threshold while the names whose leading character is "G" appear, as illustrated in FIG. 31, names whose leading character is, for example, "M" six characters after "G" in alphabet appear.

As illustrated in FIG. 30, flicking in the rightward direction 380 is performed on the display area 2*a* with the manipulator 350 while the names whose leading character is a specific character appear in the display area 2*a*. In this case, when the flick speed of the flicking is smaller than a threshold, the display controller 250 displays, in the display area 2*a*, the names whose leading character is a character immediately preceding the specific character in alphabet. Meanwhile, when the flick speed of the flicking is not less than the threshold, the display controller 250 displays the names whose leading character is a plurality of characters before the specific character.

Figure 32:
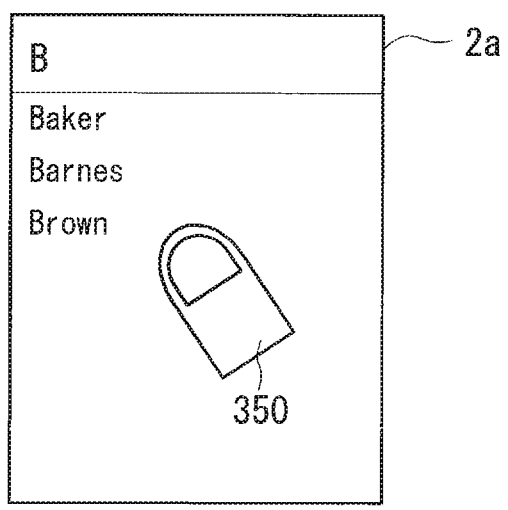
FIG. 32 illustrates a display example of the electronic apparatus.

For example, as illustrated in FIG. 30, when the touch panel 130 detects rightward flicking whose flick speed is smaller than a threshold while the names whose leading character is "H" appear in the display area 2*a*, as illustrated in FIG. 29, names whose leading character is "G" preceding "H" in alphabet appear. When the touch panel 130 detects rightward flicking whose flick speed is not less than the threshold while the names whose leading character is "H" appear in the display area 2*a*, as illustrated in FIG. 32, the names, whose leading character is "B" six characters before "H" in alphabet, appear.

When the touch panel 130 detects flicking whose flick speed is smaller than a threshold while the data associated with a specific character of alphabet appears in the display area 2*a*, the display controller 250 can execute, as a first processing, the processing of displaying, in the display area 2*a*, the data associated with one of the characters preceding and following the character associated with the data displayed in the display area 2*a*.

When the touch panel 130 detects flicking whose flick speed is not less than the threshold while the data associated with a specific character of alphabet appears in the display area 2*a*, the display controller 250 can execute, as a second processing, the processing of displaying, in the display area 2*a*, the data associated with a character a plurality of characters separate from the character associated with the data appearing in the display area 2*a*.

Although the example above has described the case in which a plurality of names contained in an address book appear, the electronic apparatus 1 can similarly display a plurality of pieces of data each associated with one character contained in Japanese alphabet or in alphabet as long as the storage module 103 stores the plurality of pieces of data in addition to the names contained in an address book.

<Processing Example During Execution of Map Display Application>

Described below is the processing performed by the controller 100 when the touch panel 130 detects flicking while a map appears in the display area 2*a* as a result of the execution of a map display application.

When the touch panel 130 detects flicking while a map appears in the display area 2*a*, the electronic apparatus 1 scrolls the display of the display area 2*a* in the flick direction of the flicking. The electronic apparatus 1 can scroll the display of the map in any direction.

In one embodiment, the touch panel 130 detects flicking while a map appears in the display area 2*a* and, when the flick speed of the flicking is smaller than a threshold, the display controller 250 controls the display panel 120 to scroll the display of the display area 2*a* by an amount corresponding to the flick speed in the flick direction of the flicking. For example, if the flick direction is the upper left direction, the display controller 250 scrolls the display of the display area 2*a* in the upper left direction by an amount corresponding to the flick speed.

Meanwhile, the touch panel 130 detects flicking while a map appears in the display area 2*a* and, when the flick speed of the flicking is not less than the threshold, the display controller 250 controls the display panel 120 to scroll the display of the display area 2*a* by an amount of one screen in the flick direction of the flicking. For example, if the flick direction is the lower right direction, the display controller 250 scrolls the display of the display area 2a by an amount of one screen.

<Processing Example During Display of Home Screen>

As described above, when the home key 5a is manipulated, a home screen appears in the display area 2a. FIG. 33 illustrates a display example of a home screen 500. At least one application icon 510 appears in the home screen 500. In the example of FIG. 33, a plurality of application icons 510 appear in the home screen 500. The application icons 510 are associated one-to-one with the applications 103b of the storage module 103. When the application icon 510 in the home screen 500 is tapped, the application executing module 210 executes the application 103b associated with the application icon 510.

In one embodiment, the display controller 250 can display the plurality of home screens 500 by switching them. In one embodiment, as illustrated in FIG. 34, for example, first to fifth home screens 500a to 500e are provided. One home screen 500 of the first to fifth home screens 500a to 500e appears in the display area 2a. When the home key 5a is manipulated, for example, the third home screen 500c appears.

The order of the first to fifth home screens 500a to 500e is determined, which is used to determine a home screen 500 that will appear next upon detection of vertical flicking while a home screen 500 appears in the display area 2a. In this example, the first to fifth home screens 500a to 500e are numbered one to five, respectively, where the first home screen 500a is placed first, and the fifth home screen 500e is placed last.

The touch panel 130 detects leftward flicking while a home screen 500 appears and, when the flick speed of the flicking is smaller than a threshold, the display controller 250 controls the display panel 120 to display, in the display area 2a, a home screen 500 following the home screen 500 currently appearing in the display area 2a. For example, when the touch panel 130 detects leftward flicking whose flick speed is smaller than the threshold while the second home screen 500b appears, the display controller 250 displays the third home screen 500c following the second home screen 500b in the display area 2a. Meanwhile, the touch panel 130 detects leftward flicking while a home screen 500 appears and, when the flick speed of the flicking is not less than the threshold, the display controller 250 controls the display panel 120 to display the last fifth home screen 500e in the display area 2a.

The touch panel 130 detects rightward flicking while a home screen 500 appears and, when the flick speed of the flicking is smaller than a threshold, the display controller 250 controls the display panel 120 to display, in the display area 2a, the home screen 500 preceding the home screen 500 currently appearing in the display area 2a. For example, when the touch panel 130 detects rightward flicking whose flick speed is smaller than the threshold while the fourth home screen 500d appears, the display controller 250 displays the third home screen 500c preceding the fourth home screen 500d in the display area 2a. Meanwhile, the touch panel 130 detects rightward flicking while a home screen 500 appears and, when the flick speed of the flicking is not less than the threshold, the display controller 250 controls the display panel 120 to display the first home screen 500a in the display area 2a.

As described above, when the flick speed of flicking, which has been detected by the touch panel 130 while one home screen 500 of a plurality of home screens 500 appears in the display area 2a, is smaller than a threshold, the display controller 250 can execute, as a first processing, the processing of displaying, in the display area 2a, one of the home screens 500 preceding and following the home screen 500 currently appearing in the display area 2a. The user can accordingly slowly perform vertical flicking on the display area 2a to operate the electronic apparatus 1 such that a home screen 500 appearing in the display area 2a is switched to an immediately preceding or following home screen 500.

When the flick speed of flicking, which has been detected by the touch panel 130 while one home screen 500 of a plurality of home screens 500 appears in the display area 2a, is not less than the threshold, the display controller 250 can execute, as a second processing, the processing of displaying, in the display area 2a, one of the first and second home screens 500 out of the plurality of home screens 500. The user can accordingly quickly perform horizontal flicking on the display area 2a to operate the electronic apparatus 1 such that a home screen 500 appearing in the display area 2a is switched to the first or last home screen 500.

In the example above, a home screen 500 appearing in the display area 2a is switched by horizontal flicking. Alternatively, a home screen 500 appearing in the display area 2a may be switched by vertical flicking.

Specifically, when the touch panel 130 detects upward flicking whose flick speed is smaller than a threshold while a home screen 500 appears, the display controller 250 displays, in the display area 2a, a home screen 500 following the home screen 500 currently appearing in the display area 2a. Meanwhile, when the touch panel 130 detects upward flicking whose flick speed is not less than the threshold while a home screen 500 appears, the display controller 250 displays the last fifth home screen 500e in the display area 2a.

When the touch panel 130 detects downward flicking whose flick speed is smaller than the threshold while a home screen 500 appears, the display controller 250 displays, in the display area 2a, a home screen 500 preceding the home screen 500 currently appearing in the display area 2a. Meanwhile, when the touch panel 130 detects downward flicking whose flick speed is not less than the threshold while a home screen 500 appears, the display controller 250 displays the first home screen 500a in the display area 2a.

<Processing Example During Execution of Data Playback Application>

The following describes the processing executed by the controller 100 when the touch panel 130 detects flicking while a data playback application is executed. Described below is an example in which a music playback control application is executed.

FIG. 35 illustrates a state in which a music playback screen 600 appears in the display area 2a through execution of a music playback control application. The music playback screen 600 shows a title 610 of music data being a playback target. The music playback screen 600 also shows a play button 620, a fast-forward button 630, and a fast-rewind button 640. When the play button 620 is tapped, a sound output controller 260, which functions as a data playback module, reads the music data being selected as a playback target from the storage module 103 and then plays back the read music data. Music is accordingly output from an earphone connected to the external speaker 170 or the earphone terminal 9.

In one embodiment, the storage module 103 creates a plurality of folders that save music data. FIG. 36 illustrates an example of the plurality of folders that save music data. As illustrated in FIG. 36, a first folder 710, a second folder 720, and a third folder 730 are formed in the storage module 103. The first folder 710 saves pieces of music data A to E of an artist X. The second folder 720 saves pieces of music data F to J of an artist Y. The third folder 730 saves pieces of music data K to O of an artist Z.

In this example, an order of the pieces of music data A to E in the first folder 710 is determined, which is used to determine music data in the first folder 710 to be played back next when horizontal clicking is detected with specific music data in the first folder 710 being a playback target. The pieces of music data A to E are numbered starting from one in the order of, for example, Japanese alphabet of the title of the music data. In this example, the pieces of music data A to E are numbered one to five, respectively, where the music data A is placed first and the music data E is placed last.

Similarly, the pieces of music data F to J in the second folder 720 are numbered starting from one in the order of, for example, Japanese alphabet of the title of the music data. In this example, the pieces of music data F to J are numbered one to five, respectively. Similarly, the pieces of music data K to O in the third folder 730 are numbered starting from one in the order of, for example, Japanese alphabet of the title of the music data. In this example, the pieces of music data K to O are numbered one to five, respectively.

In one embodiment, when the touch panel 130 detects vertical flicking while the music playback screen 600 appears in the display area 2a, the sound output controller 260 changes music data being a playback target.

Specifically, when the music playback screen 600 appears in the display area 2a, as illustrated in FIG. 35, the touch panel 130 detects flicking in the leftward direction 390 with the manipulator 350 while one piece of music data out of the pieces of music data A to E in the first folder 710 is a playback target. In this case, when the flick speed of the flicking is smaller than a threshold, the sound output controller 260 determines music data following the music data being a current playback target as a new playback target. For example, when the touch panel 130 detects leftward flicking whose flick speed is smaller than the threshold while the music data D is a playback target, the display controller 250 determines the music data E following the music data D as a playback target.

Meanwhile, when the music playback screen 600 appears in the display area 2a, the touch panel 130 detects leftward flicking while one piece of music data out of the pieces of music data A to E in the first folder 710 is a playback target. In this case, when the flick speed of the flicking is not less than the threshold, the sound output controller 260 determines the last music data E out of the pieces of music data A to E in the first folder 710 as a playback target.

When the music playback screen 600 appears in the display area 2a, the touch panel 130 detects rightward flicking while one piece of music data out of the pieces of music data A to E in the first folder 710 is a playback target. In this case, when the flick speed of the flicking is smaller than the threshold, the sound output controller 260 determines the music data preceding the music data being a current playback target as a new playback target. For example, when the touch panel 130 detects rightward flicking whose flick speed is smaller than the threshold while the music data B is a playback target, the display controller 250 determines the music data A preceding the music data B as a playback target.

Meanwhile, when the music playback screen 600 appears in the display area 2a, the touch panel 130 detects rightward flicking where one piece of music data out of the pieces of music data A to E in the first folder 710 is a playback target. In this case, when the flick speed of the flicking is not less than the threshold, the sound output controller 260 determines the first (leading) music data A out of the pieces of music data A to E in the first folder 710 as a playback target.

The controller 100 operates as described above when the touch panel 130 detects rightward or leftward flicking while the music data included in the plurality of pieces of music data F to J in the second folder 720 is a playback target or when the touch panel 130 detects rightward or leftward flicking while the music data included in the plurality of pieces of music data K to O in the third folder 730 is a playback target.

As described above, in the case where the touch panel 130 detects flicking while one piece of music data included in a plurality of pieces of music data whose order has been determined is a playback target, the sound output controller 260 executes a processing as follows. When the flick speed of the flicking is smaller than a threshold, the sound output controller 260 can execute, as a first processing, the processing of changing the data being a playback target to one of the pieces of music data preceding and following the one piece of music data. Meanwhile, when the flick speed of the flicking is not less than the threshold, the sound output controller 260 can execute, as a second processing, the processing of changing the data being a playback target to one of the first music data and the last music data out of the pieces of music data. This enables the user to slowly flick the display area 2a, thereby operating the electronic apparatus 1 such that music data being a playback target changes sequentially. This also enables the user to quickly perform flicking, thereby operating the electronic apparatus 1 such that the first or the last music data is a playback target.

In the determined order of the first folder 710, the second folder 720, and the third folder 730, when the touch panel 130 detects flicking while music data in one of the folders is a playback target, the sound output controller 260 may operate differently from the above. In other words, in such a case, when the flick speed of the flicking is smaller than a threshold, the sound output controller 260 may change the data being a playback target from the music data being a current playback target to one of the pieces of music data preceding and following the music data in the folder saving the data music data. Meanwhile, when the flick speed of the flicking is not less than the threshold, the sound output controller 260 may change the data being a playback target from the music data being a current playback target to the music data in one of the folders preceding and following the folder saving the music data. The following describes a specific example of the above.

For example, when the first folder 710 is the first folder, the second folder 720 is the second folder, and the third folder 730 is the last folder, the music data H in the second folder 720 is determined as a playback target. In such a case, when the touch panel 130 detects leftward flicking whose flick speed is smaller than a threshold, the sound output controller 260 changes the data being a playback target to the music data I following the music data H in the second folder 720. Meanwhile, when the touch panel 130 detects leftward flicking whose flick speed is not less than the threshold, the sound output controller 260 changes the data being a playback target to the music data in the third folder 730 following the second folder 720, for example, to the first music data K.

When the touch panel 130 detects rightward flicking whose flick speed is smaller than the threshold, the sound output controller 260 changes the data being a playback target to the music data G preceding the music data H in the second folder 720. Meanwhile, when the touch panel 130 detects rightward flicking whose flick speed is not less than the threshold, the sound output controller 260 changes the data being a playback target to the music data in the first folder 710 preceding the second folder 720, for example, to the first music data A.

Although the example above has described the case in which music data is played back, also in the case where moving image data is played back, the electronic apparatus 1 can similarly change moving image data being a playback target.

In one embodiment, as described above, the processing executed when the flick speed of flicking, which has been detected by the touch panel 130, is smaller than a threshold differs from the processing executed when the flick speed is greater than the threshold. Therefore, the user can change the flick speed of flicking to cause the electronic apparatus 1 to execute a different processing. Therefore, the manipulation performance of the electronic apparatus 1 can be improved.

<Variations>
<First Variation>

Although the controller 100 executes the first and second processings by switching them in accordance with a flick speed, the controller 100 may execute three or more different processings by switching them in accordance with a flick speed. For example, when the touch panel 130 detects flicking, the controller 100 may execute the first processing for the flick speed of the flicking that is smaller than a first threshold, execute a second processing different from the first processing for the flick speed not less than the first threshold and smaller than a second threshold (second threshold>first threshold), and execute a third processing different from the first and second processing for the flick speed not less than the second threshold.

As the combination examples of the first to third processings, the following are considered: a first processing of scrolling display by an amount corresponding to a flick speed, a second processing of scrolling display by an amount of one screen, and a third processing of scrolling display by an amount of two screens. As another example, the following are considered: a first processing of displaying data immediately preceding or following the currently appearing data, a second processing of displaying data two pieces of data before or after the currently appearing data, and a third processing of displaying the first or the last data.

The controller 100 executes different three or more processings by switching them in accordance with a flick speed, thereby further improving the manipulation performance of the electronic apparatus 1.

<Second Variation>

In the example above, the controller 100 executes the first and second processings by switching them in accordance with the flick speed of the flicking. Alternatively, the controller 100 may, in principle, execute the first processing when the touch panel 130 detects flicking and may exceptionally execute the second processing when the touch panel 130 detects a specific manipulation different from the flicking and then detects flicking. For the specific manipulation being, for example, tapping, when the touch panel 130 detects tapping and then detects flicking within a processing time, the controller 100 executes the second processing. The specific manipulation may be a manipulation other than tapping.

In one variation, as described above, when the touch panel 130 detects a specific manipulation and then detects flicking, the second processing, which differs from the first processing that is originally performed upon detection of flicking, is executed exceptionally. Also in this case, the manipulation performance of the electronic apparatus 1 can be improved.

<Other Variations>

Although the example above has described the case in which the present disclosure is applied to mobile phones, the present disclosure can also be applied to electronic apparatuses other than mobile phones, such as tablets and PDAs (personal digital assistants).

While the electronic apparatus 1 has been shown and described in detail, the foregoing description is in all aspects illustrative and not restrictive. Also, the variations are applicable in combination as long as they are consistent with each other. It is therefore understood that numerous modifications and variations can be devised without departing from the scope of the invention.

The invention claimed is:

1. An electronic apparatus, comprising:
   a display comprising a display area;
   a touch panel configured to detect a flick operation that comprises contact or proximity, with the touch panel for at least a predetermined distance, that ends within a predetermined period of time; and
   at least one processor configured to
   determine a moving speed of the flick operation,
   when the moving speed is smaller than a threshold, execute first processing that performs a transition in proportion to the moving speed, and,
   when the moving speed is greater than the threshold, execute second processing that performs a fixed transition.

2. The electronic apparatus according to claim 1, wherein the transition in proportion to the moving speed and the fixed transition are transitions in data being displayed on the display.

3. The electronic apparatus according to claim 2, wherein the first processing comprises scrolling the display by an amount corresponding to the moving speed, and wherein the second processing comprises scrolling the display by a fixed amount.

4. The electronic apparatus according to claim 2, wherein the first processing comprises switching a current display screen to a new display screen that immediately precedes or follows the current display screen in a display order, and wherein the second processing comprises switching the current display screen to a first or last display screen in the display order.

5. The electronic apparatus according to claim 2, wherein the first processing comprises switching a currently displayed web page to a new web page that immediately precedes or follows the currently displayed web page in a browsing order, and wherein the second processing comprises switching the currently displayed web page to a first or last web page in the browsing order.

6. The electronic apparatus according to claim 2, wherein the first processing comprises switching currently displayed first data associated with a first kana character of a Japanese alphabet to second data associated with a second kana character of the Japanese alphabet that immediately precedes or follows the first kana character, and wherein the second processing comprises switching the currently displayed first data to third data associated with a third kana character of the Japanese alphabet that is on a line preceding or following a line that includes the first kana character.

7. The electronic apparatus according to claim 2, wherein the first processing comprises switching currently displayed first data associated with a first character in an alphabet to second data associated with a second character in the alphabet that immediately precedes or follows the first character, and wherein the second processing comprises switching the currently displayed first data to third data associated with a third character in the alphabet that is a fixed plurality of characters from the first character.

8. The electronic apparatus according to claim 2, wherein the first processing comprises switching currently displayed first data to second data that immediately precedes or follows the first data in an order, and wherein the second processing comprises switching the currently displayed first data to third data that is first or last in the order.

9. The electronic apparatus according to claim 2, wherein the first processing comprises switching a currently displayed first data associated with a first folder to second data associated with the first folder that immediately precedes or follows the first data within a data order of the first folder, and wherein the second processing comprises switching the currently displayed first data to third data in a second folder that immediately precedes or follows the first folder within a folder order of a plurality of folders.

10. The electronic apparatus according to claim 1, wherein the transition in proportion to the moving speed and the fixed transition are transitions in playback.

11. The electronic apparatus according to claim 10, wherein the first processing comprises switching a current playback target from first data to second data that immediately precedes or follows the first data in a playback order, and wherein the second processing comprises switching the current playback target from the first data to third data that is first or last in the playback order.

12. The electronic apparatus according to claim 10, wherein the first processing comprises switching a current playback target from first data associated with a first folder to second data associated with the first folder that immediately precedes or follows the first data in a playback order of the first folder, and wherein the second processing comprises switching the current playback target from the first data to third data associated with a second folder that immediately precedes or follows the first folder within a folder order of a plurality of folders.

13. The electronic apparatus according to claim 1, wherein the at least one processor is configured to:
  determine a moving direction of the flick operation;
  when the moving direction is a first direction and the moving speed is smaller than the threshold, execute the first processing;
  when the moving direction is the first direction and the moving speed is greater than the threshold, execute the second processing;
  when the moving direction is a second direction different from the first direction and the moving speed is smaller than the threshold, execute third processing that performs a transition in proportion to the moving speed and is different than the first processing; and,
  when the moving direction is the second direction and the moving speed is greater than the threshold, execute fourth processing that performs a fixed transition and is different than the second processing.

14. A non-transitory computer-readable storage medium readable that stores a control program configured to cause a processor of an electronic apparatus to:
  detect a flick operation that comprises contact or proximity, with a touch panel for at least a predetermined distance, that ends within a predetermined period of time;
  determines a moving speed of the flick operation;
  when the moving speed is smaller than a threshold, execute first processing that performs a transition in proportion to the moving speed; and,
  when the moving speed is greater than the threshold, execute second processing that performs a fixed transition.

15. An operating method of an electronic apparatus comprising a display area, the operating method comprising:
  detecting a flick operation that comprises contact or proximity, with a touch panel for at least a predetermined distance, that ends within a predetermined period of time;
  determining a moving speed of the flick operation;
  when the moving speed is smaller than a threshold, executing first processing that performs a transition in proportion to the moving speed; and,
  when the moving speed is greater than the threshold, executing second processing that performs a fixed transition.

* * * * *